United States Patent
Yoganandan et al.

(10) Patent No.: US 12,518,473 B1
(45) Date of Patent: Jan. 6, 2026

(54) METHOD AND DEVICE FOR DYNAMICALLY ADJUSTING A POINTER VISUALIZATION

(71) Applicant: Apple Inc., Cupertino, CA (US)

(72) Inventors: Arun Rakesh Yoganandan, San Francisco, CA (US); Zachary Z. Becker, Santa Clara, CA (US); Jue Wang, San Mateo, CA (US); Anette L Freiin von Kapri, Mountain View, CA (US); Michelle Chua, Cupertino, CA (US); Aaron M. Burns, Sunnyvale, CA (US); Benjamin R. Blachnitzky, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 186 days.

(21) Appl. No.: 18/215,788

(22) Filed: Jun. 28, 2023

Related U.S. Application Data

(60) Provisional application No. 63/357,138, filed on Jun. 30, 2022.

(51) Int. Cl.
  *G06T 15/00* (2011.01)
  *G06T 15/50* (2011.01)

(52) U.S. Cl.
  CPC .......... *G06T 15/50* (2013.01); *G06T 2210/21* (2013.01)

(58) Field of Classification Search
  CPC .... G06F 3/011; G06F 3/04815; G06F 3/0338; G06F 3/0346; G06F 3/04842; G06F 3/04847; G06F 3/04892; G06T 15/50; G06T 2210/21; G06T 15/06
  See application file for complete search history.

(56) References Cited

U.S. PATENT DOCUMENTS

| | | | |
|---|---|---|---|
| 8,576,222 B2 | 11/2013 | Handley et al. | |
| 9,282,319 B2 | 3/2016 | Konno et al. | |
| 10,257,500 B2 | 4/2019 | Hosenpud et al. | |
| 2017/0017323 A1 | 1/2017 | Yu et al. | |
| 2019/0034076 A1 | 1/2019 | Mnayak et al. | |
| 2021/0141444 A1* | 5/2021 | Speelman | G06F 3/012 |
| 2021/0233330 A1 | 7/2021 | Sutherland et al. | |

\* cited by examiner

*Primary Examiner* — Hau H Nguyen
(74) *Attorney, Agent, or Firm* — Fernando & Partners, LLP

(57) ABSTRACT

The method includes: while presenting virtual content, detecting a control device within a physical environment; determining whether a ray projecting from a portion of the control device intersects with the virtual content; presenting a first visualization associated with the ray projected from the portion of the control device with a first set of appearance characteristics according to a determination that the ray projected from the portion of the control device does not intersect with the virtual content; and presenting a second visualization associated with the ray projected from the portion of the control device different from the first visualization with a second set of appearance characteristics different from the first set of appearance characteristics according to a determination that the ray projected from the portion of the control device intersects with the virtual content.

20 Claims, 15 Drawing Sheets

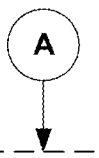

While presenting the first visualization associated with the ray projected from the portion of the control device with the first set of appearance characteristics, detect a user input directed to the control device; and
    In response to detecting the user input directed to the control device, transition from the first visualization to the second visualization associated with the ray projected from the portion of the control device with the second set of appearance characteristics ⎯ 710

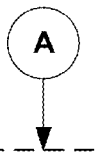

While presenting the first visualization associated with the ray projected from the portion of the control device with the first set of appearance characteristics, detect a voice command to transition to the second visualization; and
    In response to detecting the voice command, transition from the first visualization to the second visualization associated with the ray projected from the portion of the control device with the second set of appearance characteristics ⎯ 712

Figure 7B

METHOD AND DEVICE FOR DYNAMICALLY ADJUSTING A POINTER VISUALIZATION

CROSS-REFERENCE TO RELATED APPLICATIONS

Applications is claims priority to U.S. Provisional Patent App. No. 63/357,138, filed on Jun. 30, 2022, which is hereby incorporated by reference in its entirety.

TECHNICAL FIELD

The present disclosure generally relates to user interactions with a control device and, in particular, to systems, methods, and devices for dynamically adjusting a pointer visualization associated with the control device.

BACKGROUND

Typically, laser pointers or other pointing implements correspond to a single color and/or shape. In some cases, the color and/or shape may be manually adjusted.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A and 7B illustrate a flowchart representation of a method of dynamically adjusting a pointer visualization in accordance with some implementations.

Figure 1:
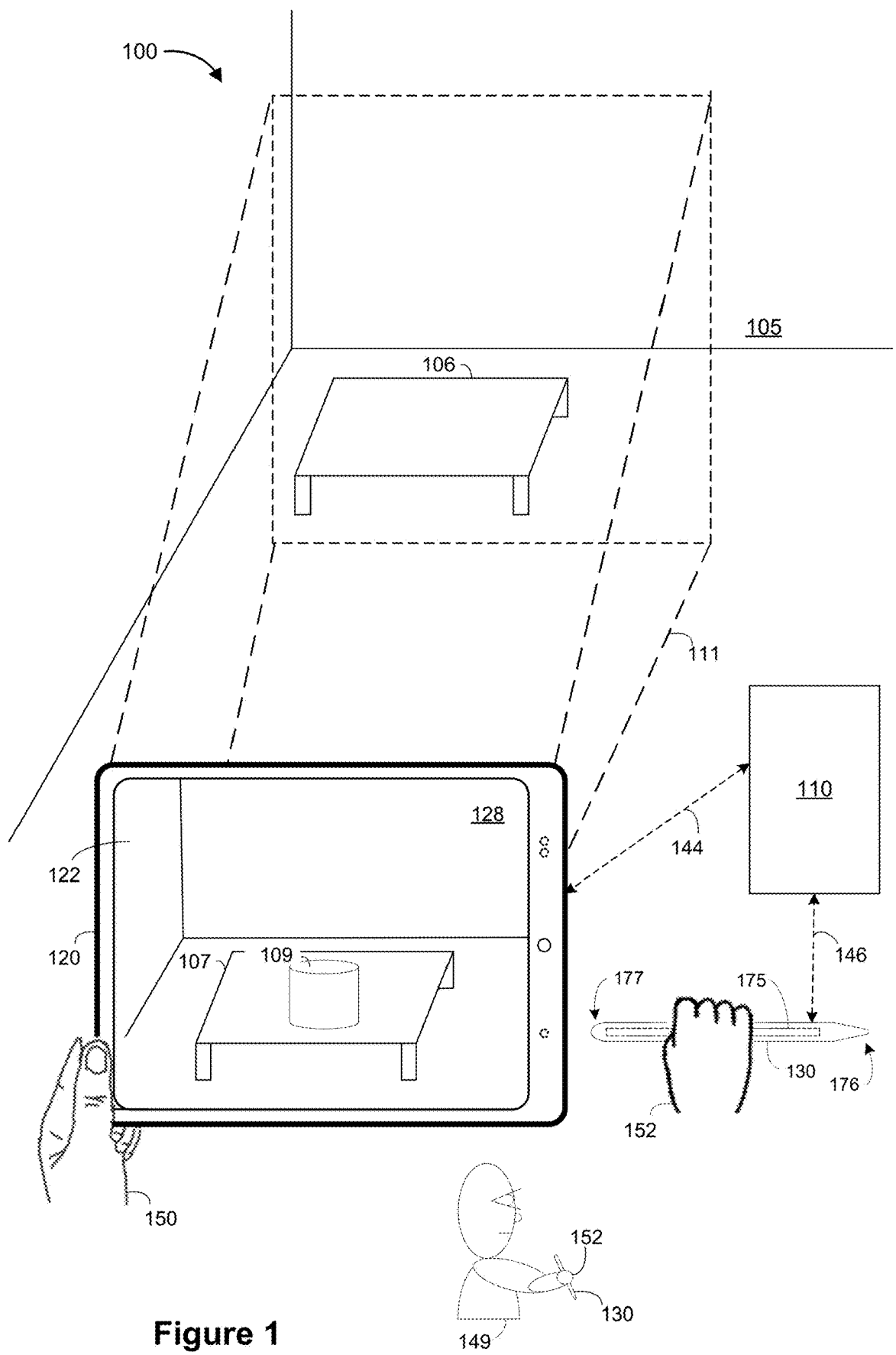
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for dynamically adjusting a pointer visualization. According to some implementations, the method is performed at a computing system including non-transitory memory and one or more processors, wherein the computing system is communicatively coupled to a display device and one or more input devices via a communication interface. The method includes: while presenting virtual content via the display device, detecting a control device within a physical environment; determining whether a ray projecting from a portion of the control device intersects with the virtual content; presenting, via the display device, a first visualization associated with the ray projected from the portion of the control device with a first set of appearance characteristics according to a determination that the ray projected from the portion of the control device does not intersect with the virtual content; and presenting, via the display device, a second visualization associated with the ray projected from the portion of the control device different from the first visualization with a second set of appearance characteristics different from the first set of appearance characteristics according to a determination that the ray projected from the portion of the control device intersects with the virtual content.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an extended reality (XR) experience (sometimes also referred to herein as a "XR environment" or a "virtual environment" or a "graphical environment") for a user 149 with a left hand 150 and a right hand 152 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

As shown in FIG. 1, the user 149 grasps a control device 130 in his/her right hand 152. As shown in FIG. 1, the control device 130 includes a first end 176 and a second end 177. In various embodiments, the first end 176 corresponds to a tip of the control device 130 (e.g., the tip of a pencil) and the second end 177 corresponds to the opposite or bottom end of the control device 130 (e.g., the eraser of the pencil). In some implementations, the control device 130 includes a suitable combination of software, firmware, and/or hardware. The control device 130 is described in greater detail below with respect to FIG. 4. In some implementations, the control device 130 corresponds to an electronic device with a wired or wireless communication channel to the controller 110. For example, the control device 130 corresponds to a stylus, a finger-wearable device, a handheld device, or the like. In some implementations, the controller 110 is communicatively coupled with the control device 130 via one or more wired or wireless communication channels 146 (e.g., BLUETOOTH, IEEE 802.11x, IEEE 802.16x, IEEE 802.3x, etc.).

In some implementations, the electronic device 120 is configured to present audio and/or video (A/V) content to the user 149. In some implementations, the electronic device 120 is configured to present a user interface (UI) and/or an XR environment 128 to the user 149. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 149 while the user 149 is physically present within a physical environment 105 that includes a table 106 within the field-of-view (FOV) 111 of the electronic device 120. As such, in some implementations, the user 149 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 106 or a representation 107 thereof) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the representation 107 of the table 106. For example, the display 122 corresponds to a transparent lens, and the electronic device 120 corresponds to a pair of glasses worn by the user 149. As such, in some implementations, the electronic device 120 presents a user interface by projecting the XR content (e.g., the XR cylinder 109) onto the additive display, which is, in turn, overlaid on the physical environment 105 from the perspective of the user 149. In some implementations, the electronic device 120 presents the user interface by displaying the XR content (e.g., the XR cylinder 109) on the additive display, which is, in turn, overlaid on the physical environment 105 from the perspective of the user 149.

In some implementations, the user 149 wears the electronic device 120 such as a near-eye system. As such, the electronic device 120 includes one or more displays provided to display the XR content (e.g., a single display or one for each eye). For example, the electronic device 120 encloses the FOV of the user 149. In such implementations, the electronic device 120 presents the XR environment 128 by displaying data corresponding to the XR environment 128 on the one or more displays or by projecting data corresponding to the XR environment 128 onto the retinas of the user 149.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 149 does not wear the electronic device 120.

In some implementations, the controller 110 and/or the electronic device 120 cause an XR representation of the user 149 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 149 is physically within the physical environment 105. In some implementations, the remote input devices include microphones, and the input data includes audio data associated with the user 149 (e.g., speech samples). In some implementations, the remote input devices include image sensors (e.g., cameras), and the input data includes images of the user 149. In some implementations, the input data characterizes body poses of the user 149 at different times. In some implementations, the input data characterizes head poses of the user 149 at different times. In some implementations, the input data characterizes hand tracking information associated with the hands of the user 149 at different times. In some implementations, the input data characterizes the velocity and/or acceleration of body parts of the user 149 such as his/her hands. In some implementations, the input data indicates joint positions and/or joint orientations of the user 149. In some implementations, the remote input devices include feedback devices such as speakers, lights, or the like.

Figure 2:
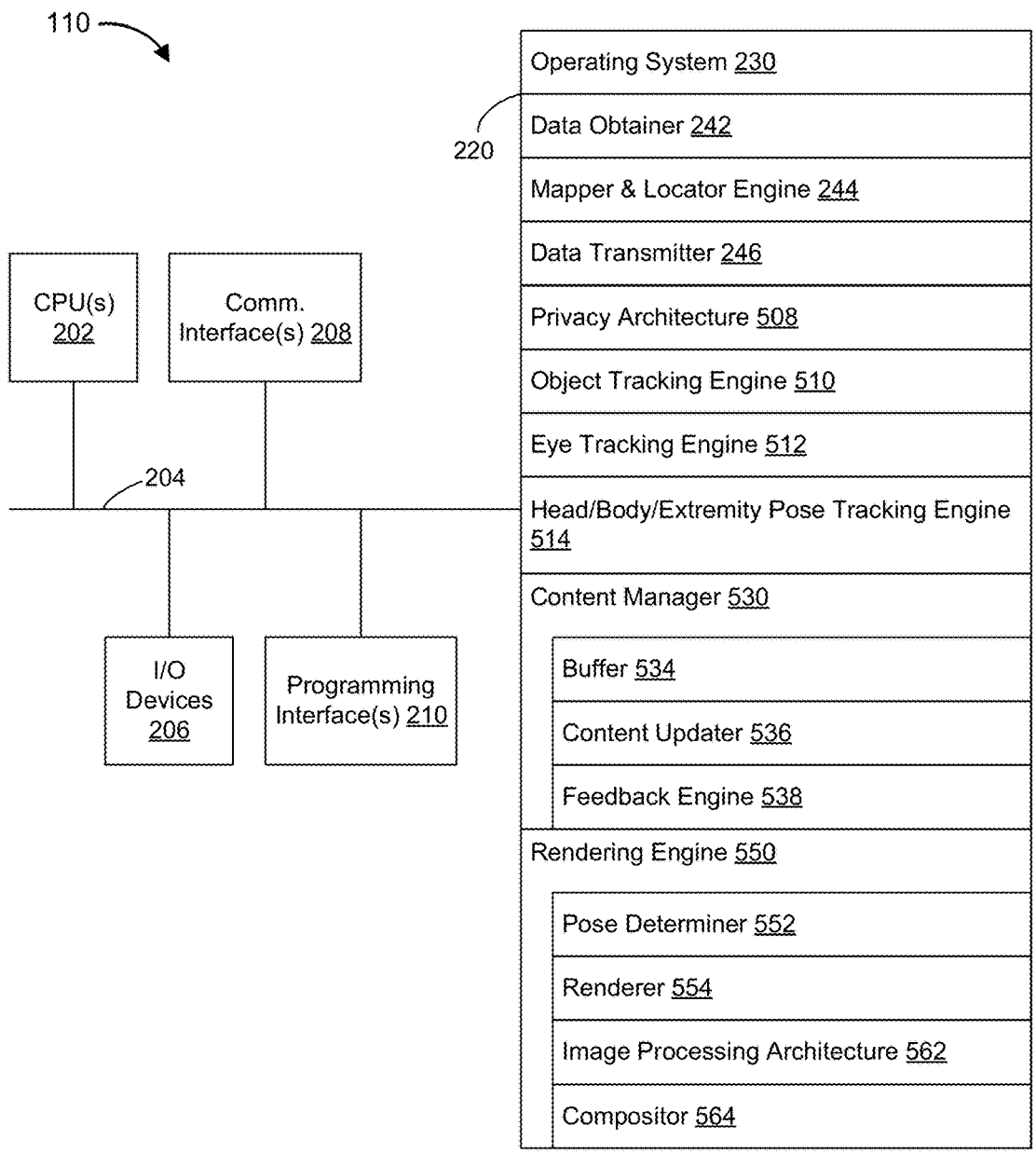
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 149 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a privacy architecture 508 is configured to ingest data and filter user information and/or identifying information within the data based on one or more privacy filters. The privacy architecture 508 is described in more detail below with reference to FIG. 5A. To that end, in various implementations, the privacy architecture 508 includes instructions and/or logic therefor, and heuristics and metadata therefor.

In some implementations, an object tracking engine 510 is configured to determine/generate an object tracking vector 511 for tracking a physical object (e.g., the control device 130 or a proxy object) based on tracking data and update the object tracking vector 511 over time. For example, as shown in FIG. 5B, the object tracking vector 511 includes translational values 572 for the physical object (e.g., associated with x, y, and z coordinates relative to the physical environment 105 or the world-at-large), rotational values 574 for the physical object (e.g., roll, pitch, and yaw), one or more input (pressure) values 576 associated with the physical object, optional touch input information 578 associated with the physical object, and/or the like. The object tracking engine 510 is described in more detail below with reference to FIG. 5A. To that end, in various implementations, the object tracking engine 510 includes instructions and/or logic therefor, and heuristics and metadata therefor.

In some implementations, an eye tracking engine 512 is configured to determine/generate an eye tracking vector 513 as shown in FIG. 5B (e.g., with a gaze direction) based on the input data and update the eye tracking vector 513 over time. For example, the gaze direction indicates a point (e.g., associated with x, y, and z coordinates relative to the physical environment 105 or the world-at-large), a physical object, or a region of interest (ROI) in the physical environment 105 at which the user 149 is currently looking. As another example, the gaze direction indicates a point (e.g., associated with x, y, and z coordinates relative to the XR environment 128), an XR object, or a region of interest (ROI) in the XR environment 128 at which the user 149 is currently looking. The eye tracking engine 512 is described in more detail below with reference to FIG. 5A. To that end, in various implementations, the eye tracking engine 512 includes instructions and/or logic therefor, and heuristics and metadata therefor.

In some implementations, a head/body/extremity pose tracking engine 514 is configured to determine/generate a pose characterization vector 515 based on the input data and update the pose characterization vector 515 over time. For example, as shown in FIG. 5B, the pose characterization vector 515 includes a head pose descriptor 592A (e.g., upward, downward, neutral, etc.), translational values 592B for the head pose, rotational values 592C for the head pose, a body pose descriptor 594A (e.g., standing, sitting, prone, etc.), translational values 594B for body sections/extremities/limbs/joints, rotational values 594C for the body sections/extremities/limbs/joints, and/or the like. The head/body/extremity pose tracking engine 514 is described in more detail below with reference to FIG. 5A. To that end, in various implementations, the head/body/extremity pose tracking engine 514 includes instructions and/or logic therefor, and heuristics and metadata therefor. In some implementations, the object tracking engine 510, the eye tracking engine 512, and the head/body/extremity pose tracking engine 514 may be located on the electronic device 120 in addition to or in place of the controller 110.

In some implementations, a content manager 530 is configured to manage and update the layout, setup, structure, and/or the like for the user interface (UI) or the XR environment 128 including one or more of VA(s), XR content, one or more user interface (UI) elements associated with the XR content, and/or the like. The content manager 530 is described in more detail below with reference to FIG. 5C. To that end, in various implementations, the content manager 530 includes instructions and/or logic therefor, and heuristics and metadata therefor. In some implementations, the content manager 530 includes a buffer 534, a content updater 536, and a feedback engine 538. In some implementations, the buffer 534 includes XR content, a rendered image frame, and/or the like for one or more past instances and/or frames.

In some implementations, the content updater 536 is configured to modify the UI or the XR environment 128 over time based on translational or rotational movement of the electronic device 120 or physical objects within the physical environment 105, user inputs (e.g., hand/extremity tracking inputs, eye tracking inputs, touch inputs, voice commands, manipulation inputs with the physical object, and/or the like), and/or the like. To that end, in various implementations, the content updater 536 includes instructions and/or logic therefor, and heuristics and metadata therefor.

In some implementations, the feedback engine 538 is configured to generate sensory feedback (e.g., visual feedback such as text or lighting changes, audio feedback, haptic feedback, etc.) associated with the XR environment 128. To that end, in various implementations, the feedback engine 538 includes instructions and/or logic therefor, and heuristics and metadata therefor.

In some implementations, a rendering engine 550 is configured to render an XR environment 128 (sometimes also referred to herein as a "graphical environment" or "virtual environment") or image frame associated therewith as well as the VA(s), XR content, one or more UI elements associated with the XR content, and/or the like. To that end, in various implementations, the rendering engine 550 includes instructions and/or logic therefor, and heuristics and metadata therefor. In some implementations, the rendering engine 550 includes a pose determiner 552, a renderer 554, an optional image processing architecture 562, and an optional compositor 564. One of ordinary skill in the art will appreciate that the optional image processing architecture 562 and the optional compositor 564 may be present for video pass-through configurations but may be removed for fully VR or optical see-through configurations.

In some implementations, the pose determiner 552 is configured to determine a current camera pose of the electronic device 120 and/or the user 149 relative to the A/V content and/or XR content. The pose determiner 552 is described in more detail below with reference to FIG. 5A. To that end, in various implementations, the pose determiner 552 includes instructions and/or logic therefor, and heuristics and metadata therefor.

In some implementations, the renderer 554 is configured to render the A/V content and/or the XR content according to the current camera pose relative thereto. The renderer 554 is described in more detail below with reference to FIG. 5A. To that end, in various implementations, the renderer 554 includes instructions and/or logic therefor, and heuristics and metadata therefor.

In some implementations, the image processing architecture 562 is configured to obtain (e.g., receive, retrieve, or capture) an image stream including one or more images of the physical environment 105 from the current camera pose of the electronic device 120 and/or the user 149. In some implementations, the image processing architecture 562 is also configured to perform one or more image processing operations on the image stream such as warping, color correction, gamma correction, sharpening, noise reduction, white balance, and/or the like. The image processing architecture 562 is described in more detail below with reference to FIG. 5A. To that end, in various implementations, the image processing architecture 562 includes instructions and/or logic therefor, and heuristics and metadata therefor.

In some implementations, the compositor 564 is configured to composite the rendered A/V content and/or XR content with the processed image stream of the physical environment 105 from the image processing architecture 562 to produce rendered image frames of the XR environment 128 for display. The compositor 564 is described in more detail below with reference to FIG. 5A. To that end, in various implementations, the compositor 564 includes instructions and/or logic therefor, and heuristics and metadata therefor.

Although the data obtainer 242, the mapper and locator engine 244, the data transmitter 246, the privacy architecture 508, the object tracking engine 510, the eye tracking engine 512, the head/body/extremity pose tracking engine 514, the content manager 530, and the rendering engine 550 are shown as residing on a single device (e.g., the controller 110), it should be understood that in other implementations, any combination of the data obtainer 242, the mapper and locator engine 244, the data transmitter 246, the privacy architecture 508, the object tracking engine 510, the eye tracking engine 512, the head/body/extremity pose tracking engine 514, the content manager 530, and the rendering engine 550 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
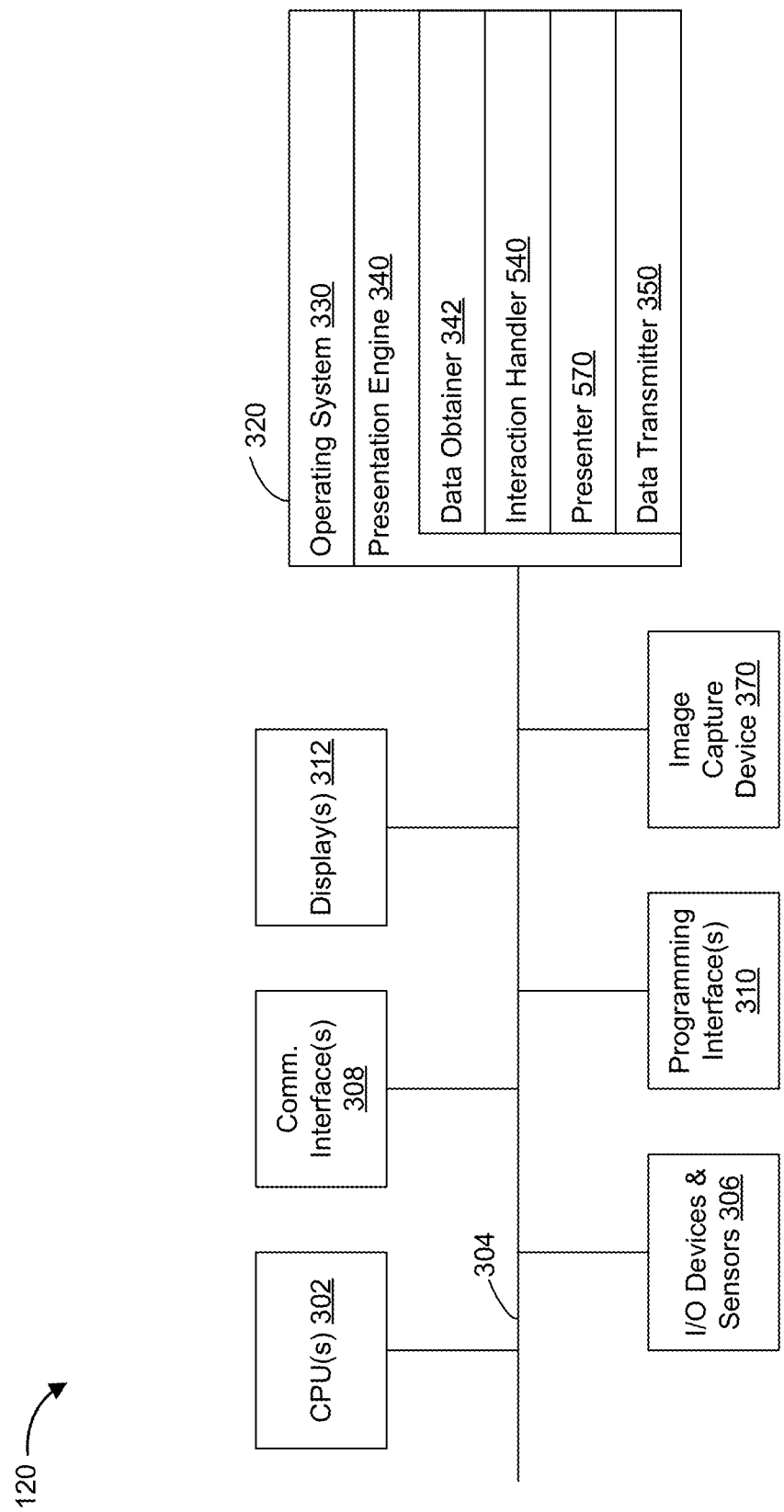
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, an interaction handler 540, a presenter 570, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 540 is configured to detect user interactions with the presented A/V content and/or XR content (e.g., gestural inputs detected via hand/extremity tracking, eye gaze inputs detected via eye tracking, voice commands, etc.). To that end, in various implementations, the interaction handler 540 includes instructions and/or logic therefor, and heuristics and metadata therefor.

In some implementations, the presenter 570 is configured to present and update A/V content and/or XR content (e.g., the rendered image frames associated with the user interface or the XR environment 128 including the VA(s), the XR content, one or more UI elements associated with the XR content, and/or the like) via the one or more displays 312. To that end, in various implementations, the presenter 570 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 540, the presenter 570, and the data transmitter 350 are shown as residing on a single device (e.g., the electronic device 120), it should be understood that in other implementations, any combination of the data obtainer 342, the interaction handler 540, the presenter 570, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
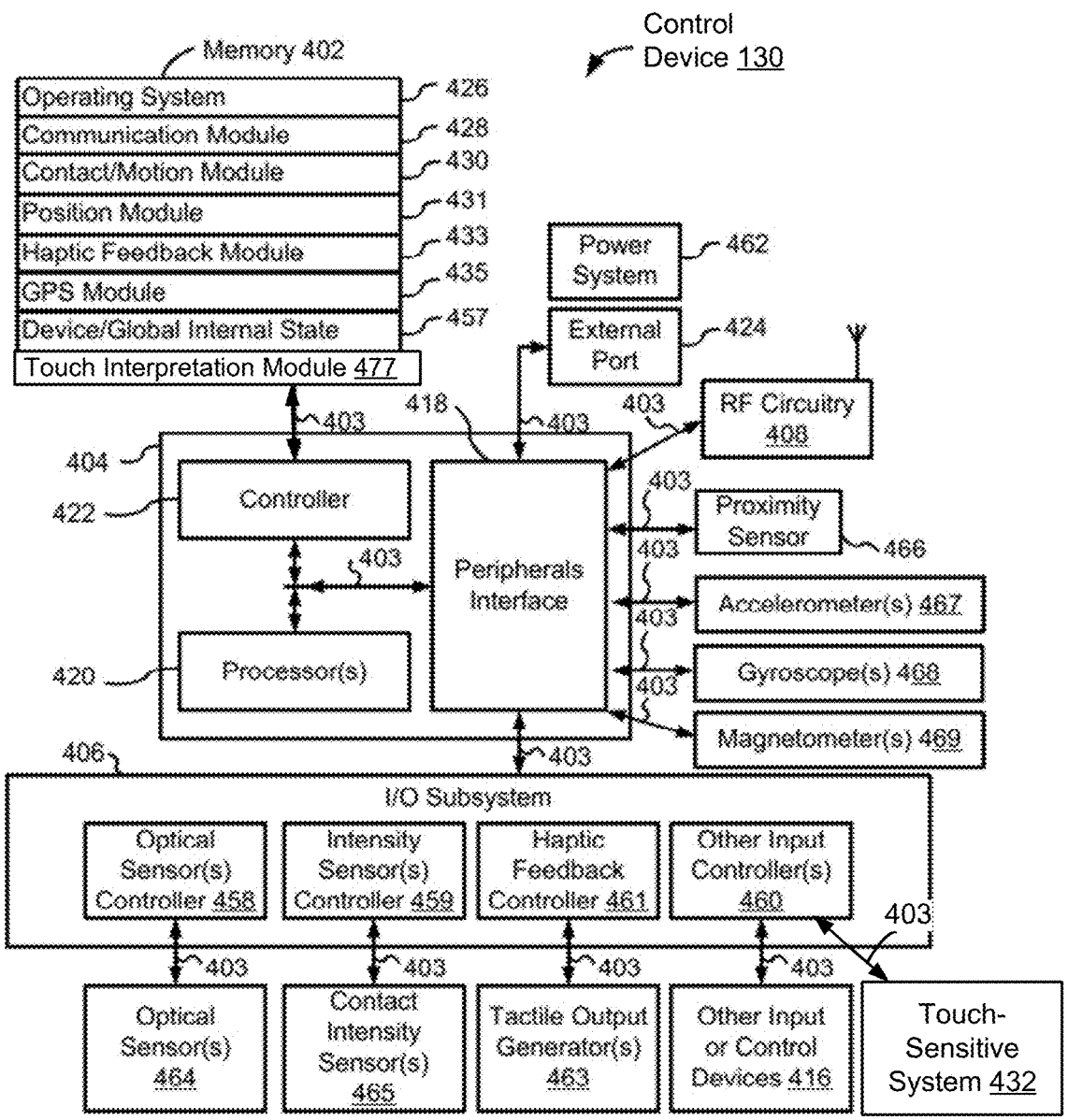
FIG. 4 is a block diagram of an example control device in accordance with some implementations.

FIG. 4 is a block diagram of an exemplary control device 130 in accordance with some implementations. The control device 130 is sometimes referred to as a stylus. The control device 130 includes non-transitory memory 402 (which optionally includes one or more computer readable storage mediums), a memory controller 422, one or more processing units (CPUs) 420, a peripherals interface 418, RF circuitry 408, an input/output (I/O) subsystem 406, and other input or control devices 416. The control device 130 optionally includes an external port 424 and one or more optical sensors 464. The control device 130 optionally includes one or more contact intensity sensors 465 for detecting the intensity (or pressure) of contacts of the control device 130 on the electronic device 100 (e.g., when the control device 130 is used with a touch-sensitive surface such as the display 122 of the electronic device 120) or on other surfaces (e.g., a desk surface). The control device 130 optionally includes one or more tactile output generators 463 for generating tactile outputs on the control device 130. These components optionally communicate over one or more communication buses or signal lines 403.

It should be appreciated that the control device 130 is only one example of an electronic stylus, and that the control device 130 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits. In some implementations, some functions and/or operations of the control device 130 (e.g., the touch interpretation module 477) are provided by the controller 110 and/or the electronic device 120. As such, in some implementations, some components of the control device 130 are integrated into the controller 110 and/or the electronic device 120.

As shown in FIG. 1, the control device 130 includes a first end 176 and a second end 177. In various embodiments, the first end 176 corresponds to a tip of the control device 130 (e.g., the tip of a pencil) and the second end 177 corresponds to the opposite or bottom end of the control device 130 (e.g., the eraser of the pencil).

As shown in FIG. 1, the control device 130 includes a touch-sensitive surface 175 to receive touch inputs from the user 149. In some implementations, the touch-sensitive surface 175 corresponds to a capacitive touch element. The control device 130 includes a sensor or set of sensors that detect inputs from the user based on haptic and/or tactile contact with the touch-sensitive surface 175. In some implementations, the control device 130 includes any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive surface 175. Because the control device 130 includes a variety of sensors and types of sensors, the control device 130 can detect different a variety of inputs from the user 149. In some implementations, the one or more sensors can detect a single touch input or a plurality of concurrent touch inputs in response to a user contacting the touch-sensitive surface 175 with multiple fingers. In some implementations, the one or more sensors can detect a single touch input or successive (e.g., sequential) touch inputs in response to a user tapping once or multiple times on the touch-sensitive surface 175. In some implementations, the one or more sensors can detect a swipe input on the control device 130 in response to the user stroking along the touch-sensitive surface 175 with one or more fingers. In some implementations, if the speed with which the user strokes along the touch-sensitive surface 175 breaches a threshold, the one or more sensors detect a flick input rather than a swipe input.

The control device 130 also includes one or more sensors that detect orientation (e.g., angular position) and/or movement of the control device 130, such as one or more accelerometers 467, one or more gyroscopes 468, one or more magnetometers 469, and/or the like. The one or more sensors can detect a variety of rotational movements of the control device 130 by the user, including the type and direction of the rotation. For example, the one or more sensors can detect the user rolling and/or twirling the control device 130, and can detect the direction (e.g., clockwise or counterclockwise) of the rolling/twirling. In some implementations, the detected input depends on the angular position of the first end 176 and the second end 177 of the control device 130 relative to the electronic device. For example, in some implementations, if the control device 130 is substantially perpendicular to the electronic device and the second end 177 (e.g., the eraser) is nearer to the electronic device, then contacting the surface of the electronic device with the second end 177 results in an erase operation. On the other hand, if the control device 130 is substantially perpendicular to the electronic device and the first end 176 (e.g., the tip) is nearer to the electronic device, then contacting the surface of the electronic device with the first end 176 results in a marking operation.

The memory 402 optionally includes high-speed random-access memory and optionally also includes non-volatile memory, such as one or more flash memory devices, or other non-volatile solid-state memory devices. Access to the memory 402 by other components of the control device 130, such as the CPU(s) 420 and the peripherals interface 418, is, optionally, controlled by the memory controller 422.

The peripherals interface 418 can be used to couple input and output peripherals of the stylus to the CPU(s) 420 and the memory 402. The one or more processors 420 run or execute various software programs and/or sets of instructions stored in the memory 402 to perform various functions for the control device 130 and to process data. In some implementations, the peripherals interface 418, the CPU(s) 420, and the memory controller 422 are, optionally, implemented on a single chip, such as chip 404. In some other embodiments, they are, optionally, implemented on separate chips.

The RF (radio frequency) circuitry 408 receives and sends RF signals, also called electromagnetic signals. The RF circuitry 408 converts electrical signals to/from electromagnetic signals and communicates with the controller 110, the electronic device 120, and/or the like, communications networks, and/or other communications devices via the electromagnetic signals. The RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), or any other suitable communication protocol, including communication protocols not yet developed as of the filing date of this document.

The I/O subsystem 406 couples input/output peripherals on the control device 130, such as the other input or control devices 416, with the peripherals interface 418. The I/O subsystem 406 optionally includes the optical sensor controller 458, the intensity sensor controller 459, the haptic feedback controller 461, and the one or more input controllers 460 for other input or control devices. The one or more input controllers 460 receive/send electrical signals from/to the other input or control devices 416. The other input or control devices 416 optionally include physical buttons (e.g., push buttons, rocker buttons, etc.), dials, slider switches, click wheels, and so forth. In some alternate embodiments, the input controller(s) 460 are, optionally, coupled with any (or none) of the following: an infrared port and/or a USB port.

The control device 130 also includes a power system 462 for powering the various components. The power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The control device 130 optionally also includes one or more optical sensors 464. FIG. 4 shows an optical sensor coupled with optical sensor controller 458 in I/O subsystem 406. The one or more optical sensors 464 optionally include charge-coupled device (CCD) or complementary metal-oxide semiconductor (CMOS) phototransistors. The one or more optical sensors 464 receive light from the environment, projected through one or more lens, and converts the light to data representing an image.

The control device 130 optionally also includes one or more contact intensity sensors 465. FIG. 4 shows a contact intensity sensor coupled with intensity sensor controller 459 in the I/O subsystem 406. The contact intensity sensors 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) relative to a surface or relative to a grasp of the user 149). The contact intensity sensors 465 receive contact intensity information (e.g., pressure information or a proxy for pressure information) from the environment. In some implementations, at least one contact intensity sensor is collocated with, or proximate to, a tip of the control device 130. In some implementations, at least one contact intensity sensor is collocated with, or proximate to, the body of the control device 130.

The control device 130 optionally also includes one or more proximity sensors 466. FIG. 4 shows the one or more proximity sensors 466 coupled with the peripherals interface 418. Alternately, the one or more proximity sensors 466 are coupled with the input controller 460 in the I/O subsystem 406. In some implementations, the one or more proximity sensors 466 determine proximity of the control device 130 to an electronic device (e.g., the electronic device 120).

The control device 130 optionally also includes one or more tactile output generators 463. FIG. 4 shows a tactile output generator coupled with a haptic feedback controller 461 in the I/O subsystem 406. The one or more tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The one or more tactile output generator(s) 463 receive tactile feedback generation instructions from the haptic feedback module 433 and generates tactile outputs on the control device 130 that are capable of being sensed by a user of the control device 130. In some implementations, at least one tactile output generator is collocated with, or proximate to, a length (e.g., a body or a housing) of the control device 130 and, optionally, generates a tactile output by moving the control device 130 vertically (e.g., in a direction parallel to the length of the control device 130) or laterally (e.g., in a direction normal to the length of the control device 130).

The control device 130 optionally also includes one or more accelerometers 467, one or more gyroscopes 468, and/or one or more magnetometers 469 (e.g., as part of an inertial measurement unit (IMU)) for obtaining information concerning the location and positional state of control device 130. FIG. 4 shows sensors 467, 468, and 469 coupled with the peripherals interface 418. Alternately, the sensors 467, 468, and 469 are, optionally, coupled with an input controller 460 in the I/O subsystem 406. The control device 130 optionally includes a GPS (or GLONASS or other global navigation system) receiver (not shown) for obtaining information concerning the location of the control device 130.

The control device 130 includes a touch-sensitive system 432. The touch-sensitive system 432 detects inputs received at the touch-sensitive surface 175. These inputs include the inputs discussed herein with respect to the touch-sensitive surface 175 of the control device 130. For example, the touch-sensitive system 432 can detect tap inputs, twirl inputs, roll inputs, flick inputs, swipe inputs, and/or the like. The touch-sensitive system 432 coordinates with a touch interpretation module 477 in order to decipher the particular kind of touch input received at the touch-sensitive surface 175 (e.g., twirl/roll/flick/swipe/etc.).

In some implementations, the software components stored in the memory 402 include an operating system 426, a communication module (or set of instructions) 428, contact/motion module (or set of instructions) 430, a position module (or set of instructions) 431, and a Global Positioning System (GPS) module (or set of instructions) 435. Furthermore, in some implementations, the memory 402 stores a device/global internal state 457, as shown in FIG. 4. Moreover, the memory 402 includes the touch interpretation module 477. The device/global internal state 457 includes one or more of: sensor state, including information obtained from the stylus's various sensors and other input or control devices 416; positional state, including information regarding the position and/or orientation of the control device 130 (e.g., translational and/or rotational values) and location information concerning the location of the control device 130 (e.g., determined by the GPS module 435).

The operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components. The communication module 428 optionally facilitates communication with other devices over one or more external ports 424 and also includes various software components for handling data received by the RF circuitry 408 and/or an external port 424. The external port 424 (e.g., Universal Serial Bus (USB), FIREWIRE, etc.) is adapted for coupling directly to other devices or indirectly over a network (e.g., the Internet, wireless LAN, etc.).

The contact/motion module 430 optionally detects contact with the control device 130 and other touch-sensitive devices of control device 130 (e.g., buttons or other touch-sensitive components of the control device 130). The contact/motion module 430 includes software components for performing various operations related to detection of contact (e.g., detection of a tip of the stylus with a touch-sensitive display, such as the display 122 of the electronic device 120, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across the display 122 of the electronic device 120), and determining if the contact has ceased (e.g., detecting a lift-off event or a break in contact). In some implementations, the contact/motion module 430 receives contact data from the I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some implementations, one or more of these operations related to detection of contact are performed by the electronic device 120 or the controller 110 (in addition to or in place of the stylus using the contact/motion module 430).

The contact/motion module 430 optionally detects a gesture input by control device 130. Different gestures with the control device 130 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some implementations, gesture detection is performed by the electronic device using contact/motion module 430 (in addition to or in place of the stylus using contact/motion module 430).

The position module 431, in conjunction with the one or more accelerometers 467, the one or more gyroscopes 468, and/or the one or more magnetometers 469, optionally detects positional information concerning the stylus, such as the attitude of the control device 130 (e.g., roll, pitch, and/or yaw) in a particular frame of reference. The position module 431, in conjunction with the one or more accelerometers 467, the one or more gyroscopes 468, and/or the one or more magnetometers 469, optionally detects movement gestures, such as flicks, taps, and rolls of the control device 130. The position module 431 includes software components for performing various operations related to detecting the position of the stylus and detecting changes to the position of the stylus in a particular frame of reference. In some implementations, the position module 431 detects the positional state of the control device 130 relative to the physical environment 105 or the world-at-large and detects changes to the positional state of the control device 130.

The haptic feedback module 433 includes various software components for generating instructions used by the one or more tactile output generators 463 to produce tactile outputs at one or more locations on the control device 130 in response to user interactions with the control device 130. The GPS module 435 determines the location of the control device 130 and provides this information for use in various applications (e.g., to applications that provide location-based services such as an application to find missing devices and/or accessories).

The touch interpretation module 477 coordinates with the touch-sensitive system 432 in order to determine (e.g., decipher or identify) the type of touch input received at the touch-sensitive surface (TSS) 175 of the control device 130. For example, the touch interpretation module 477 determines that the touch input corresponds to a swipe input (as opposed to a tap input) if the user strokes a sufficient distance across the touch-sensitive surface 175 of the control device 130 in a sufficiently short amount of time. As another example, the touch interpretation module 477 determines that the touch input corresponds to a flick input (as opposed to a swipe input) if the speed with which the user strokes across the touch-sensitive surface 175 of the control device 130 is sufficiently faster than the speed corresponding to a swipe input. The threshold speeds of strokes can be preset and can be changed. In various embodiments, the pressure and/or force with which the touch is received at the touch-sensitive surface determines the type of input. For example, a light touch can correspond to a first type of input while a harder touch can correspond to a second type of input.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some implementations, the memory 402 optionally stores a subset of the modules and data structures identified above. Furthermore, the memory 402 optionally stores additional modules and data structures not described above.

Figure 5A:
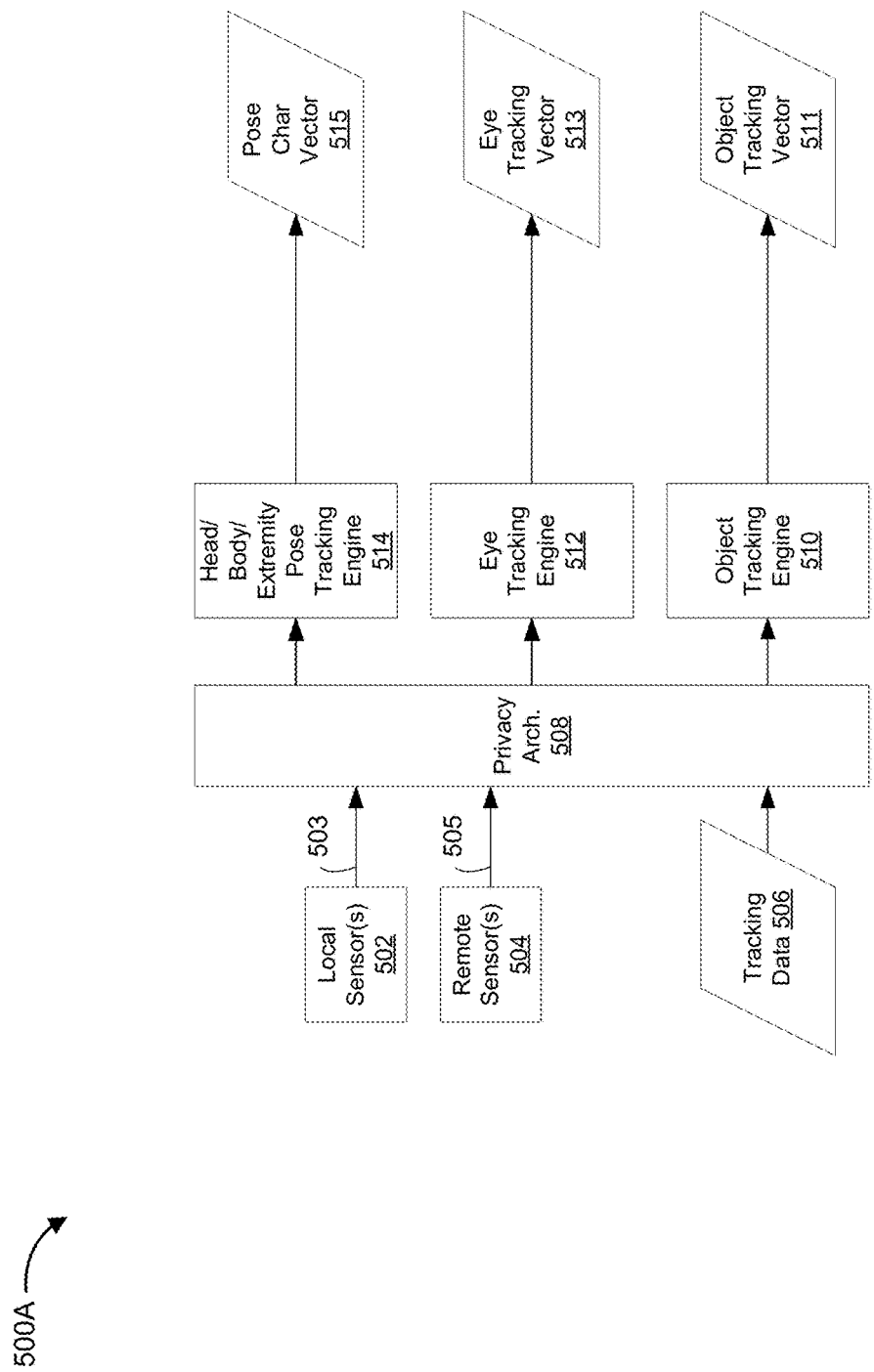
FIG. 5A is a block diagram of a first portion of an example content delivery architecture in accordance with some implementations.
Figure 5B:
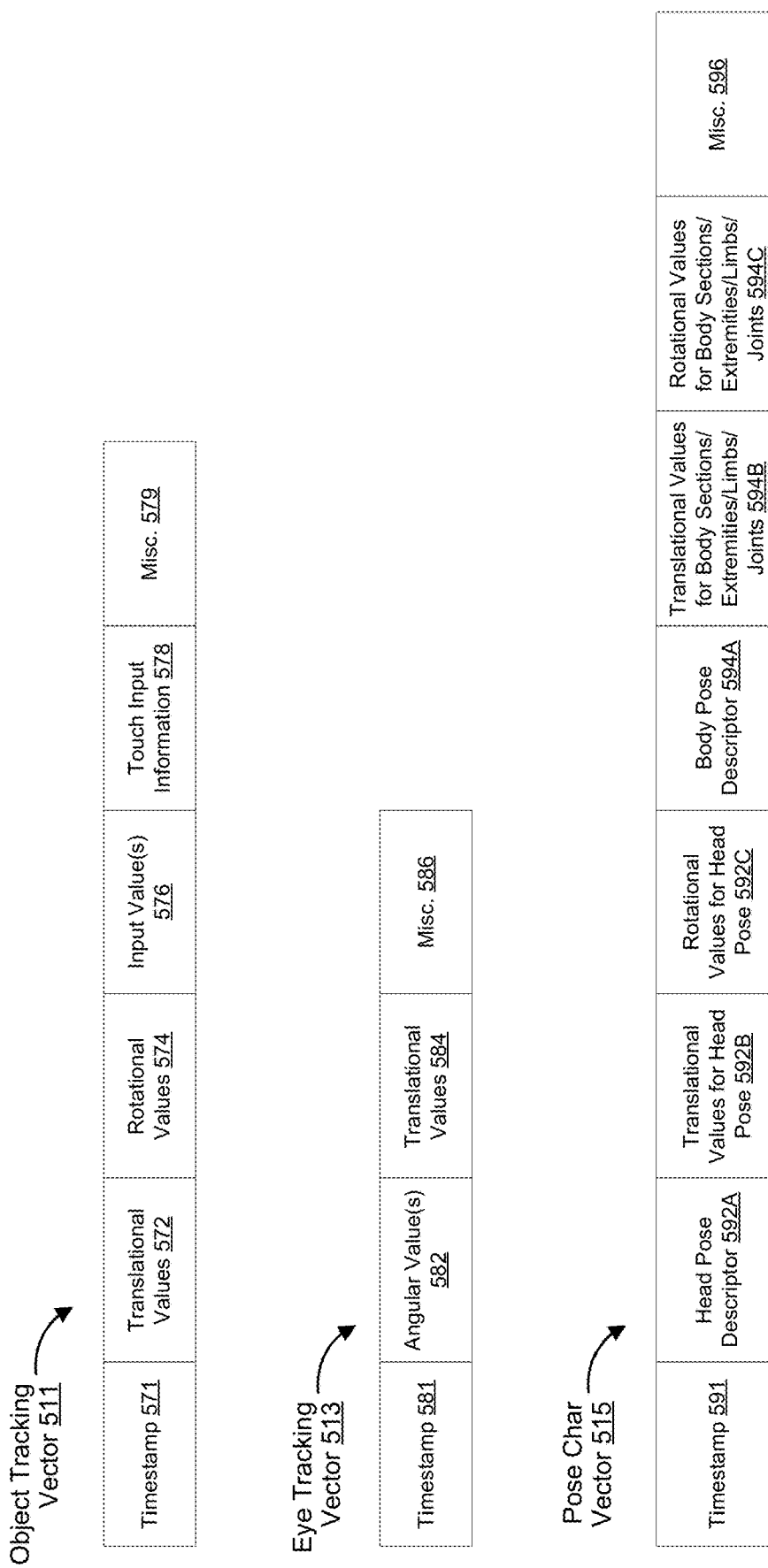
FIG. 5B illustrates example data structures in accordance with some implementations.

FIG. 5A is a block diagram of a first portion 500A of an example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof.

As shown in FIG. 5A, one or more local sensors 502 of the controller 110, the electronic device 120, and/or a combination thereof obtain local sensor data 503 associated with the physical environment 105. For example, the local sensor data 503 includes images or a stream thereof of the physical environment 105, simultaneous location and mapping (SLAM) information for the physical environment 105 and the location of the electronic device 120 or the user 149 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 503 includes un-processed or post-processed information.

Similarly, as shown in FIG. 5A, one or more remote sensors 504, associated with the optional remote input devices within the physical environment 105, the control device 130, and/or the like, obtain remote sensor data 505 associated with the physical environment 105. For example, the remote sensor data 505 includes images or a stream thereof of the physical environment 105, SLAM information for the physical environment 105 and the location of the electronic device 120 or the user 149 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 505 includes un-processed or post-processed information.

As shown in FIG. 5A, tracking data 506 is obtained by at least one of the controller 110, the electronic device 120, or the control device 130 in order to localize and track the control device 130. As one example, the tracking data 506 includes images or a stream thereof of the physical environment 105 captured by exterior-facing image sensors of the electronic device 120 that includes the control device 130. As another example, the tracking data 506 corresponds to inertial measurement unit (IMU) information, accelerometer information, gyroscope information, magnetometer information, and/or the like from integrated sensors of the control device 130.

According to some implementations, the privacy architecture 508 ingests the local sensor data 503, the remote sensor data 505, and the tracking data 506. In some implementations, the privacy architecture 508 includes one or more privacy filters associated with user information and/or identifying information. In some implementations, the privacy architecture 508 includes an opt-in feature where the electronic device 120 informs the user 149 as to what user information and/or identifying information is being monitored and how the user information and/or the identifying information will be used. In some implementations, the privacy architecture 508 selectively prevents and/or limits the content delivery architecture 500A/500B or portions thereof from obtaining and/or transmitting the user information. To this end, the privacy architecture 508 receives user preferences and/or selections from the user 149 in response to prompting the user 149 for the same. In some implementations, the privacy architecture 508 prevents the content delivery architecture 500A/500B from obtaining and/or transmitting the user information unless and until the privacy architecture 508 obtains informed consent from the user 149. In some implementations, the privacy architecture 508 anonymizes (e.g., scrambles, obscures, encrypts, and/or the like) certain types of user information. For example, the privacy architecture 508 receives user inputs designating which types of user information the privacy architecture 508 anonymizes. As another example, the privacy architecture 508 anonymizes certain types of user information likely to include sensitive and/or identifying information, independent of user designation (e.g., automatically).

According to some implementations, the object tracking engine 510 obtains the tracking data 506 after it has been subjected to the privacy architecture 508. In some implementations, the object tracking engine 510 determines/generates an object tracking vector 511 for a physical object based on the tracking data 506 and updates the object tracking vector 511 over time. As one example, the physical object corresponds to a proxy object detected within the physical environment 105 that lacks a communication channel to the computing system (e.g., the controller 110, the electronic device 120, and/or the like) such as a pencil, a pen, or the like. As another example, the physical object corresponds to an electronic device (e.g., the control device 130) with a wired or wireless communication channel to the computing system (e.g., the controller 110, the electronic device 120, and/or the like) such as a stylus, a finger-wearable device, a handheld device, or the like.

FIG. 5B shows an example data structure for the object tracking vector 511 in accordance with some implementations. As shown in FIG. 5B, the object tracking vector 511 may correspond to an N-tuple characterization vector or characterization tensor that includes a timestamp 571 (e.g., the most recent time the object tracking vector 511 was updated), one or more translational values 572 for a physical object (e.g., x, y, and z values relative to the physical environment 105, the world-at-large, and/or the like), one or more rotational values 574 for the physical object (e.g., roll, pitch, and yaw values), one or more input (pressure) values 576 associated with the physical object (e.g., a first input (pressure) value associated with contact between an end of the control device 130 and a surface, a second input (pressure) value associated with an amount of pressure exerted on a body of the control device 130 while grasped by the user 149, and/or the like), optional touch input information 578 (e.g., information associated with user touch inputs directed to the touch-sensitive surface 175 of the control device 130), and/or miscellaneous information 579. One of ordinary skill in the art will appreciate that the data structure for the object tracking vector 511 in FIG. 5B is merely an example that may include different information portions in various other implementations and be structured in myriad ways in various other implementations.

According to some implementations, the eye tracking engine 512 obtains the local sensor data 503 and the remote sensor data 505 after it has been subjected to the privacy architecture 508. In some implementations, the eye tracking engine 512 determines/generates an eye tracking vector 513 associated with a gaze direction of the user 149 based on the input data and updates the eye tracking vector 513 over time.

FIG. 5B shows an example data structure for the eye tracking vector 513 in accordance with some implementations. As shown in FIG. 5B, the eye tracking vector 513 may correspond to an N-tuple characterization vector or characterization tensor that includes a timestamp 581 (e.g., the most recent time the eye tracking vector 513 was updated), one or more angular values 582 for a current gaze direction of the user 149 (e.g., roll, pitch, and yaw values), one or more translational values 584 for the current gaze direction of the user 149 (e.g., x, y, and z values relative to the physical environment 105, the world-at-large, and/or the like), and/or miscellaneous information 586. One of ordinary skill in the art will appreciate that the data structure for the eye tracking vector 513 in FIG. 5B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 149 is currently looking. As another example, the gaze direction indicates a point (e.g., associated with x, y, and z coordinates relative to the XR environment 128), an XR object, or a region of interest (ROI) in the XR environment 128 at which the user 149 is currently looking.

According to some implementations, the head/body/extremity pose tracking engine 514 obtains the local sensor data 503 and the remote sensor data 505 after it has been subjected to the privacy architecture 508. In some implementations, the head/body/extremity pose tracking engine 514 determines/generates a pose characterization vector 515 based on the input data and updates the pose characterization vector 515 over time.

FIG. 5B shows an example data structure for the pose characterization vector 515 in accordance with some implementations. As shown in FIG. 5B, the pose characterization vector 515 may correspond to an N-tuple characterization vector or characterization tensor that includes a timestamp 591 (e.g., the most recent time the pose characterization vector 515 was updated), a head pose descriptor 592A (e.g., upward, downward, neutral, etc.), translational values for the head pose 592B, rotational values for the head pose 592C, a body pose descriptor 594A (e.g., standing, sitting, prone, etc.), translational values for body sections/extremities/limbs/joints 594B, rotational values for the body sections/extremities/limbs/joints 594C, and/or miscellaneous information 596. In some implementations, the pose characterization vector 515 also includes information associated with finger/hand/extremity tracking. One of ordinary skill in the art will appreciate that the data structure for the pose characterization vector 515 in FIG. 5B is merely an example that may include different information portions in various other implementations and be structured in myriad ways in various other implementations.

Figure 5C:
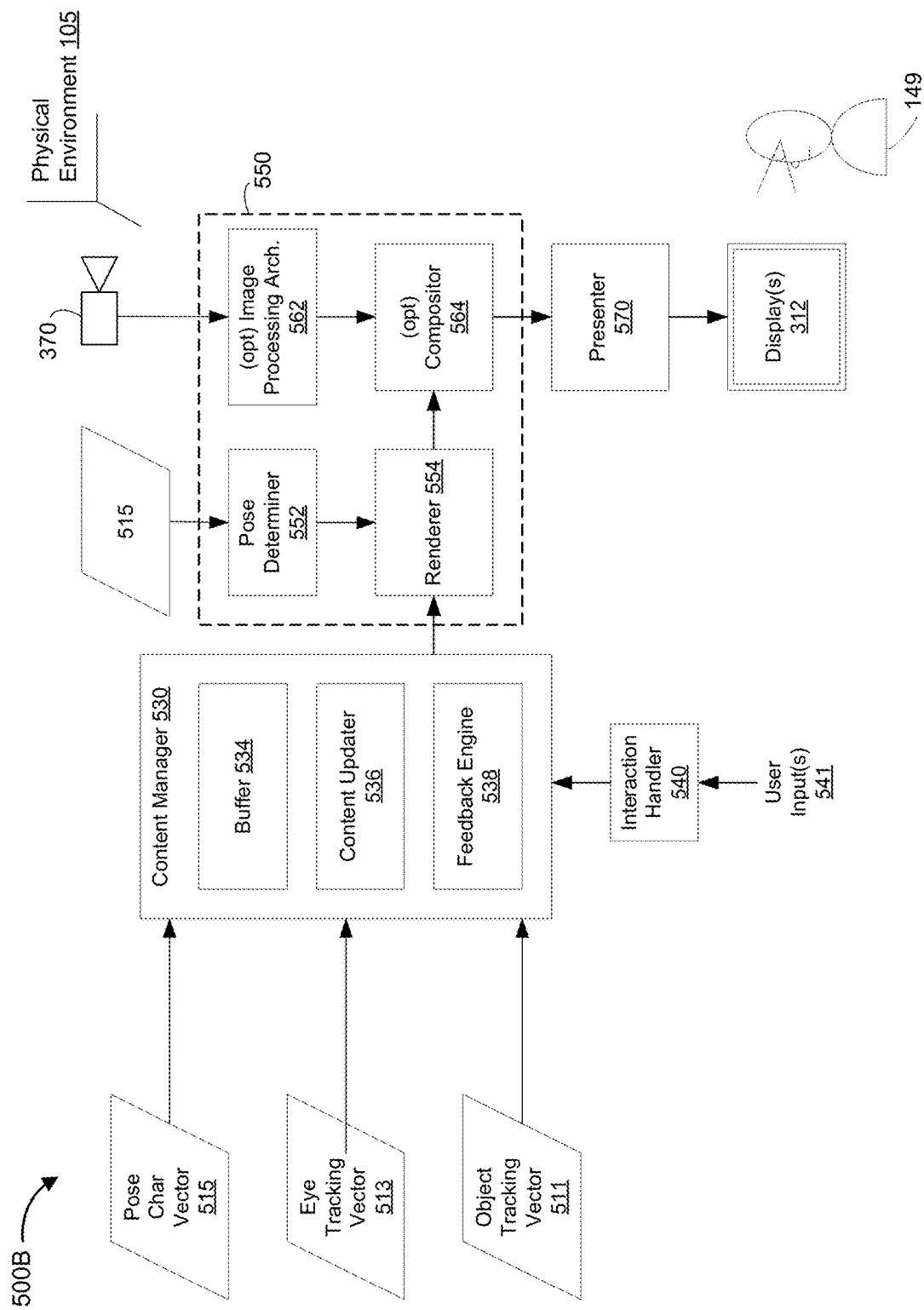
FIG. 5C is a block diagram of a second portion of the example content delivery architecture in accordance with some implementations.

FIG. 5C is a block diagram of a second portion 500B of the example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof. FIG. 5C is similar to and adapted from FIG. 5A. Therefore, similar reference numbers are used in FIGS. 5A and 5C. As such, only the differences between FIGS. 5A and 5C will be described below for the sake of brevity.

According to some implementations, the interaction handler 540 obtains (e.g., receives, retrieves, or detects) one or more user inputs 541 provided by the user 149 that are associated with interacting with the user interface or the XR environment 128. For example, the one or more user inputs 541 corresponds to eye tracking or gaze-based inputs, hand/extremity tracking inputs, touch inputs, voice inputs, and/or the like.

In various implementations, the content manager 530 manages and updates the layout, setup, structure, and/or the like for the UI or the XR environment 128, including one or more of VAs, XR content, one or more UI elements associated with the XR content, and/or the like, based on the one or more user inputs 541, the object tracking vector 511, the eye tracking vector 513, the pose characterization vector 515, and/or the like. To that end, the content manager 530 includes the buffer 534, the content updater 536, and the feedback engine 538.

In some implementations, the buffer 534 includes XR content, a rendered image frame, and/or the like for one or more past instances and/or frames. In some implementations, the content updater 536 modifies the XR environment 128 over time based on the UI element selection information 517, the audible output and modulation information 521, the one or more user inputs 541, translational or rotational movement of objects within the physical environment 105, translational or rotational movement of the electronic device 120 (or the user 149), and/or the like. In some implementations, the feedback engine 538 generates sensory feedback (e.g., visual feedback such as text or lighting changes, audio feedback, haptic feedback, etc.) associated with the XR environment 128 based on the audible output and modulation information 521, the one or more user inputs 541, and/or the like.

According to some implementations, with reference to the rendering engine 550 in FIG. 5C, the pose determiner 552 determines a current camera pose of the electronic device 120 and/or the user 149 relative to the XR environment 128 and/or the physical environment 105 based at least in part on the pose characterization vector 515. In some implementations, the renderer 554 renders the VA(s), one or more UI elements associated with the XR content, and/or the like according to the current camera pose relative thereto.

According to some implementations, the optional image processing architecture 562 obtains an image stream from an image capture device 370 including one or more images of the physical environment 105 from the current camera pose of the electronic device 120 and/or the user 149. In some implementations, the image processing architecture 562 also performs one or more image processing operations on the image stream such as warping, color correction, gamma correction, sharpening, noise reduction, white balance, and/or the like. In some implementations, the optional compositor 564 composites the rendered XR content with the processed image stream of the physical environment 105 from the image processing architecture 562 to produce rendered image frames of the XR environment 128. In various implementations, the presenter 570 presents the rendered image frames of the XR environment 128 to the user 149 via the one or more displays 312. One of ordinary skill in the art will appreciate that the optional image processing architecture 562 and the optional compositor 564 may not be applicable for fully virtual environments (or optical see-through scenarios).

FIGS. 6A-6F illustrate a sequence of instances 610-660 for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 610-660 are rendered and presented by a computing system such as the controller 110 shown in FIGS. 1 and 2; the electronic device 120 shown in FIGS. 1 and 3; and/or a suitable combination thereof.

As shown in FIGS. 6A-6F, the content delivery scenario includes a physical environment 105 and an XR environment 128 displayed on the display 122 of the electronic device 120 (e.g., associated with the user 149). The electronic device 120 presents the XR environment 128 to the user 149 while the user 149 is physically present within the physical environment 105 that includes a door 115, which is currently within the FOV 111 of an exterior-facing image sensor of the electronic device 120.

In other words, in some implementations, the electronic device 120 is configured to present XR content and to enable optical see-through or video pass-through of at least a portion of the physical environment 105 on the display 122 (e.g., the door 115 or a representation 116 thereof, and the table 106 or a representation 107 thereof). For example, the electronic device 120 corresponds to a mobile phone, tablet, laptop, near-eye system, wearable computing device, or the like.

Figure 6A:
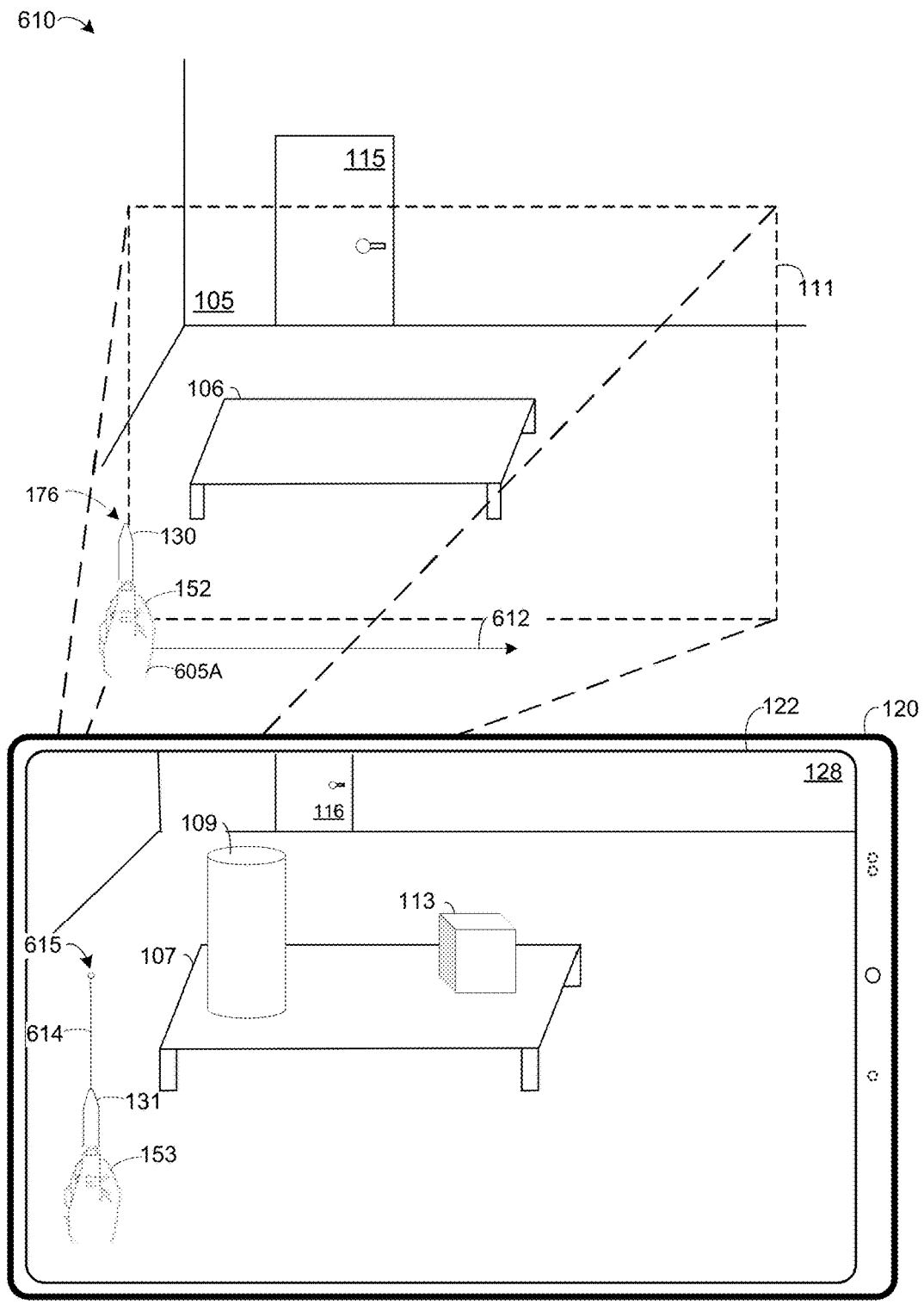
FIGS. 6A-6F illustrate a sequence of instances for a content delivery scenario in accordance with some implementations.

As shown in FIG. 6A, during the instance 610 (e.g., associated with time $T_1$) of the content delivery scenario, the electronic device 120 presents the XR environment 128 including a representation 116 of the door 115 within the physical environment 105, a representation 107 of the table 106 within the physical environment 105, and a representation 153 of the right hand 152 of the user 149 holding a representation 131 of the control device 130. As shown in FIG. 6A, the XR environment 128 includes a first virtual object 109 (e.g., an XR cylinder) and a second virtual object 113 (e.g., an XR cube) on the representation 107 of the table 106.

According to some implementations, the electronic device 120 determines whether a ray projected from a portion (e.g., the tip/end 176) of the control device 130 or the representation 131 thereof intersects with virtual content (e.g., one or more of the first virtual object 109 or the second virtual object 113). As shown in FIG. 6A, in accordance with a determination that the ray projected from the portion (e.g., the tip/end 176) of the control device 130 or the representation 131 thereof does not intersect with the first virtual object 109 or the second virtual object 113, the electronic device 120 presents a first visualization associated with the ray projected from the portion (e.g., the tip/end 176) of the control device 130 or the representation 131 with a first set of appearance characteristics. In FIG. 6A, the first visualization includes a ray 614 emanating from the portion of the representation 131 of the control device 130 with a circle 615 at the terminal end of the ray 614 with the first set of appearance characteristics (e.g., a ray thickness value, a ray opacity/translucency value, a ray color, a ray brightness, a first circle radius, a first line thickness for the perimeter of the circle, a first line color for the perimeter of the circle, a first circle fill color, a first circle fill brightness, and the like). One of ordinary skill in the art will appreciate that the first visualization and/or the first set of appearance characteristics associated therewith may be modified in myriad ways in various other implementations.

Furthermore, as shown in FIG. 6A, during the instance 610, the electronic device 120 detects movement 612 of the right hand 152 of the user 149 holding the control device 130 at location 605A within the physical environment 105. For example, the electronic device 120 detects the movement 612 based on one or more computer vision (CV) techniques, hand/extremity tracking data, IMU data from the control device 130, other sensor information from the control device 130, and/or the like.

Figure 6B:
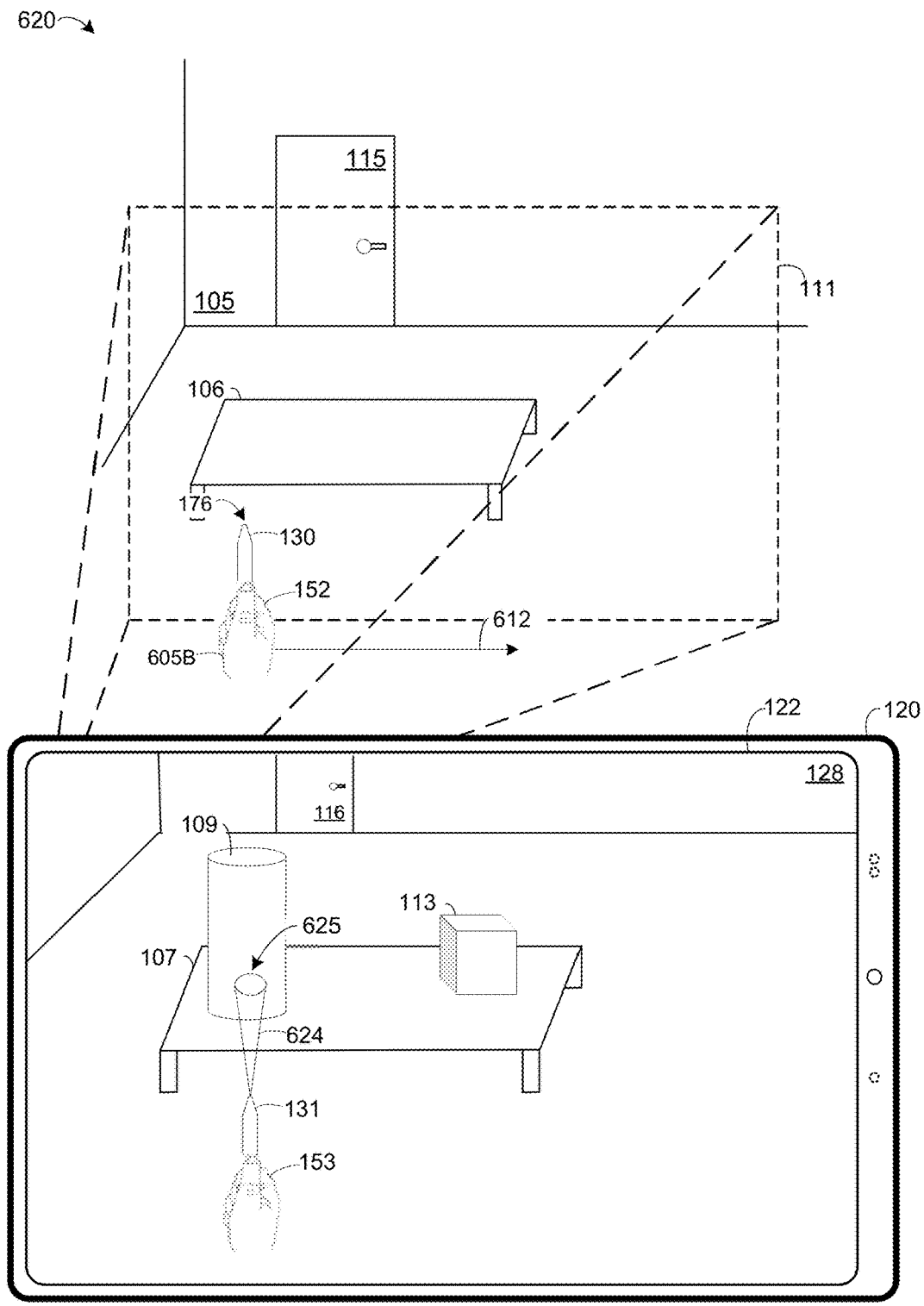

As shown in FIG. 6B, during the instance 620 (e.g., associated with time T$_2$) of the content delivery scenario, after detecting the movement 612 of the right hand 152 of the user 149 holding the control device 130 from the location 605A in FIG. 6A to a location 605B in FIG. 6B, the electronic device 120 determines whether a ray projected from a portion (e.g., the tip/end 176) of the control device 130 or the representation 131 thereof intersects with virtual content (e.g., one or more of the first virtual object 109 or the second virtual object 113). As shown in FIG. 6B, in accordance with a determination that the ray projected from the portion (e.g., the tip/end 176) of the control device 130 or the representation 131 thereof intersects with the first virtual object 109, the electronic device 120 presents a second visualization associated with the ray projected from the portion (e.g., the tip/end 176) of the control device 130 or the representation 131 with a second set of appearance characteristics. In FIG. 6B, the second visualization includes a cone 624 emanating from the portion of the representation 131 of the control device 130 with a circle 625 at the terminal end of the cone 624 with the second set of appearance characteristics (e.g., a cone thickness value, a cone opacity/translucency value, a cone color, a cone brightness, a second circle radius, a second line thickness for the perimeter of the circle, a second line color for the perimeter of the circle, a second circle fill color, a second circle fill brightness, and the like). The circle 625 in FIG. 6B is larger than the circle 615 in FIG. 6A. One of ordinary skill in the art will appreciate that the second visualization and/or the second set of appearance characteristics associated therewith may be modified in myriad ways in various other implementations.

Furthermore, as shown in FIG. 6B, during the instance 620, the electronic device 120 detects further movement 612 of the right hand 152 of the user 149 holding the control device 130 at location 605B within the physical environment 105.

Figure 6C:
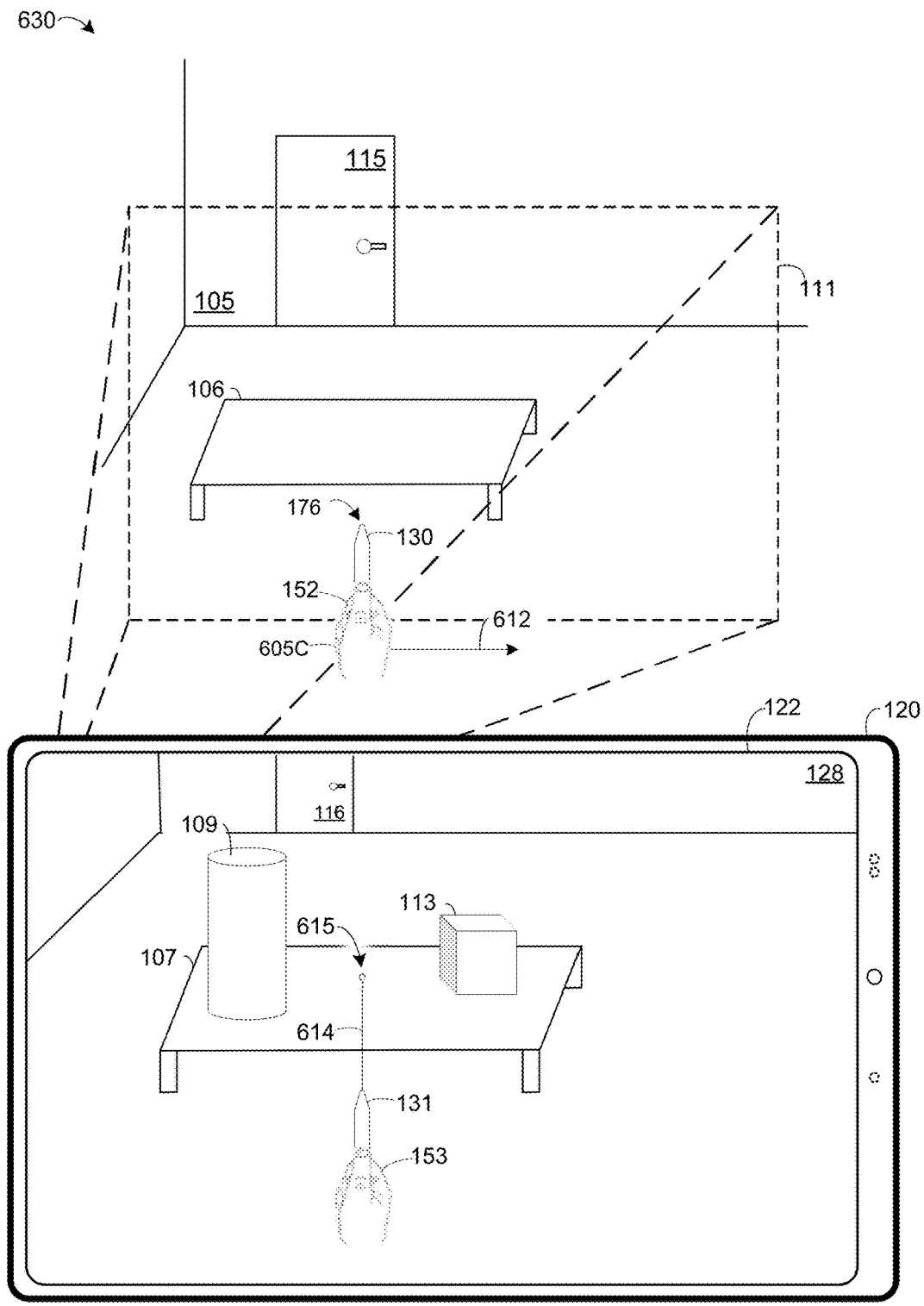

As shown in FIG. 6C, during the instance 630 (e.g., associated with time T$_3$) of the content delivery scenario, after detecting the further movement 612 of the right hand 152 of the user 149 holding the control device 130 from the location 605B in FIG. 6B to a location 605C in FIG. 6C, the electronic device 120 determines whether a ray projected from a portion (e.g., the tip/end 176) of the control device 130 or the representation 131 thereof intersects with virtual content (e.g., one or more of the first virtual object 109 or the second virtual object 113). As shown in FIG. 6C, in accordance with a determination that the ray projected from the portion (e.g., the tip/end 176) of the control device 130 or the representation 131 thereof does not intersect with the first virtual object 109 or the second virtual object 113, the electronic device 120 presents the first visualization associated with the ray projected from the portion (e.g., the tip/end 176) of the control device 130 or the representation 131 with the first set of appearance characteristics. In FIG. 6C, the first visualization includes the ray 614 emanating from the portion of the representation 131 of the control device 130 with the circle 615 at the terminal end of the ray 614 with the first set of appearance characteristics.

Furthermore, as shown in FIG. 6C, during the instance 630, the electronic device 120 detects further movement 612 of the right hand 152 of the user 149 holding the control device 130 at location 605C within the physical environment 105.

Figure 6D:
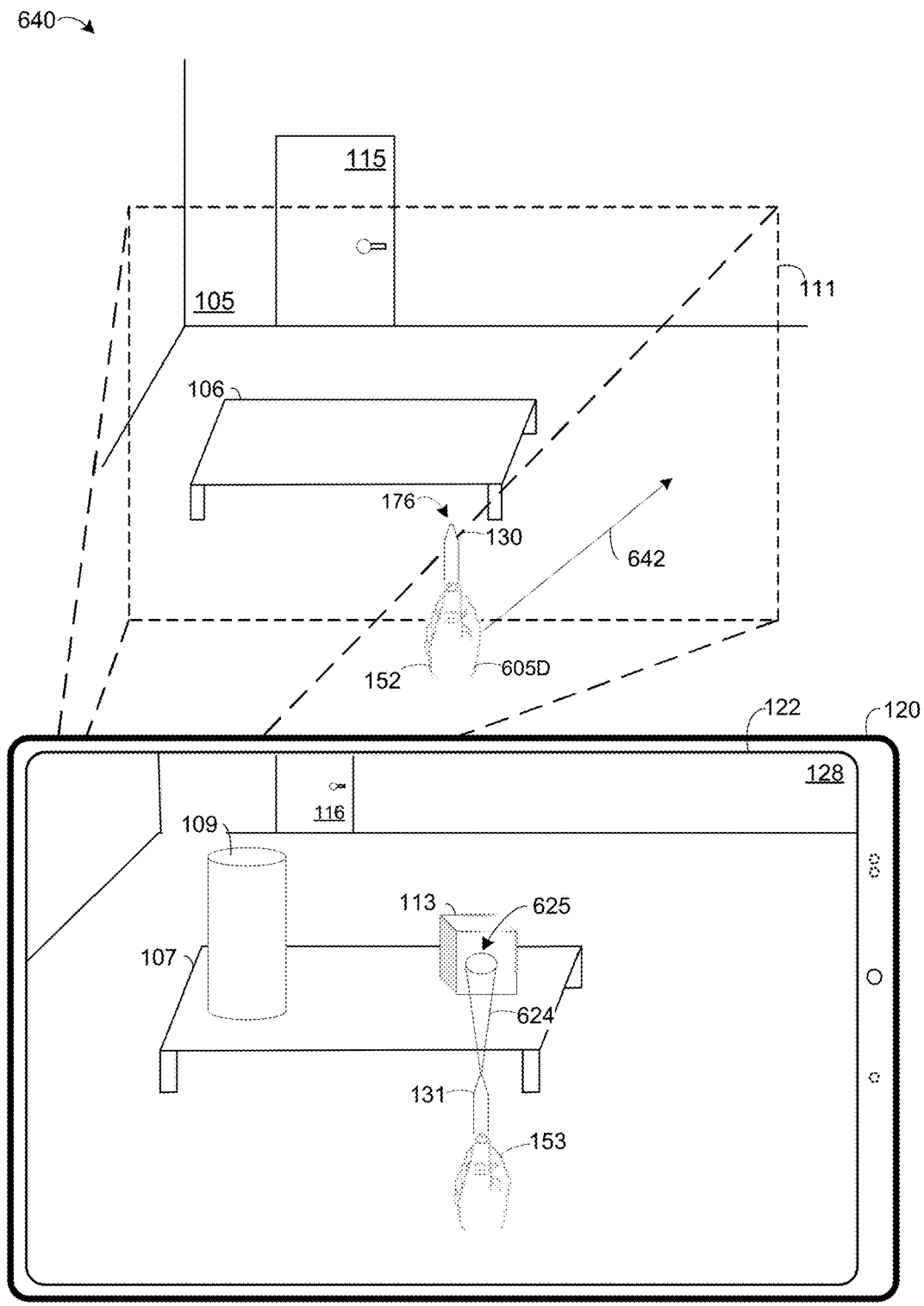

As shown in FIG. 6D, during the instance 640 (e.g., associated with time T$_4$) of the content delivery scenario, after detecting the further movement 612 of the right hand 152 of the user 149 holding the control device 130 from the location 605C in FIG. 6C to a location 605D in FIG. 6D, the electronic device 120 determines whether a ray projected from a portion (e.g., the tip/end 176) of the control device 130 or the representation 131 thereof intersects with virtual content (e.g., one or more of the first virtual object 109 or the second virtual object 113). As shown in FIG. 6D, in accordance with a determination that the ray projected from the portion (e.g., the tip/end 176) of the control device 130 or the representation 131 thereof intersects with the second virtual object 113, the electronic device 120 presents the second visualization associated with the ray projected from the portion (e.g., the tip/end 176) of the control device 130 or the representation 131 with the second set of appearance characteristics. In FIG. 6D, the second visualization includes the cone 624 emanating from the portion of the representation 131 of the control device 130 with the circle 625 at the terminal end of the cone 624 with the second set of appearance characteristics.

Furthermore, as shown in FIG. 6D, during the instance 640, the electronic device 120 detects movement 642 of the right hand 152 of the user 149 holding the control device 130 at location 605D within the physical environment 105. For example, the electronic device 120 detects the movement 642 based on one or more computer vision (CV) techniques, hand/extremity tracking data, IMU data from the control device 130, other sensor information from the control device 130, and/or the like.

Figure 6E:
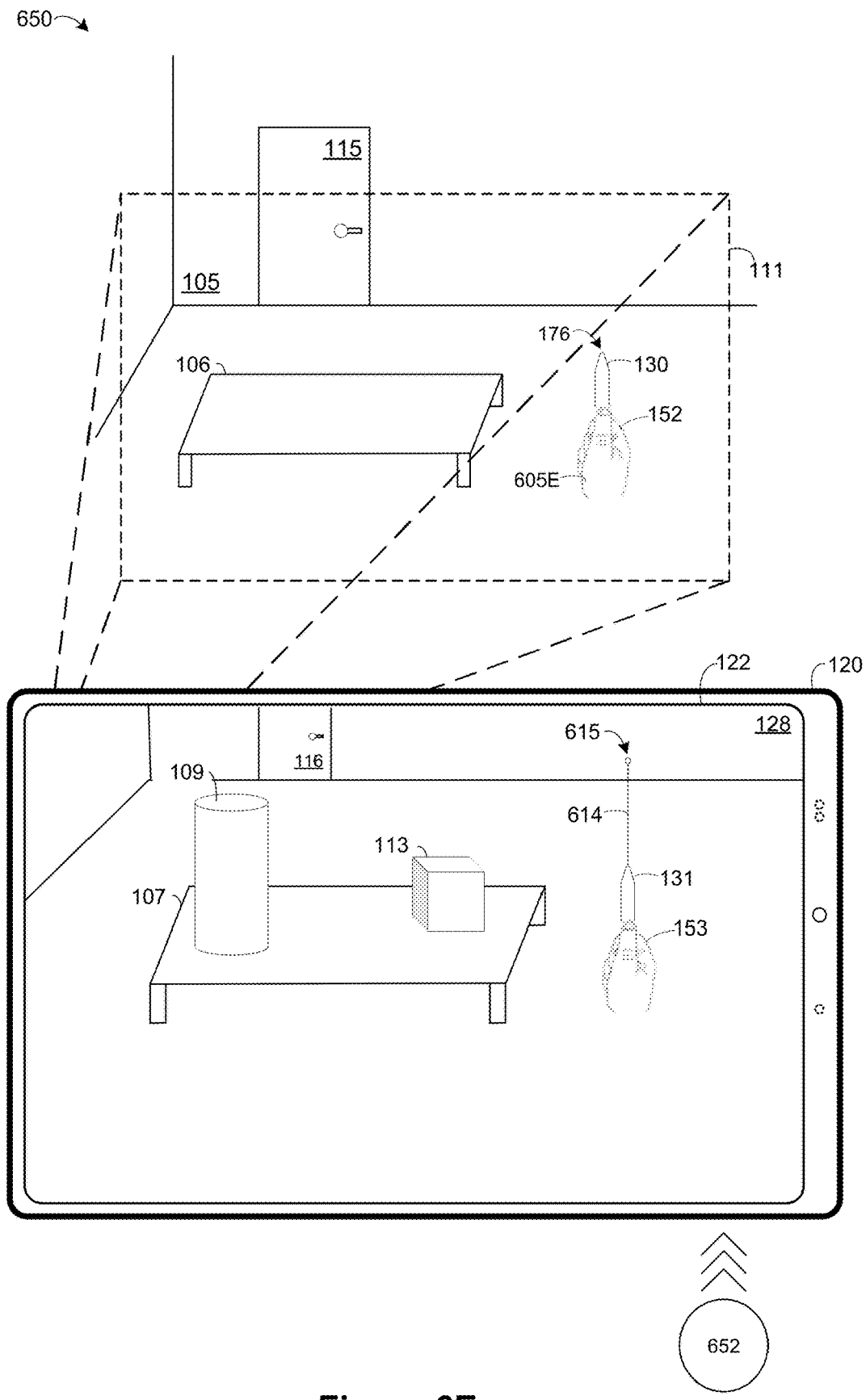

As shown in FIG. 6E, during the instance 650 (e.g., associated with time T$_5$) of the content delivery scenario, after detecting the movement 642 of the right hand 152 of the user 149 holding the control device 130 from the location 605D in FIG. 6D to a location 605E in FIG. 6E, the electronic device 120 determines whether a ray projected from a portion (e.g., the tip/end 176) of the control device 130 or the representation 131 thereof intersects with virtual content (e.g., one or more of the first virtual object 109 or the second virtual object 113). As shown in FIG. 6E, in accordance with a determination that the ray projected from the portion (e.g., the tip/end 176) of the control device 130 or the representation 131 thereof does not intersect with the virtual content, the electronic device 120 presents the first visualization associated with the ray projected from the portion (e.g., the tip/end 176) of the control device 130 or the representation 131 with the first set of appearance characteristics. In FIG. 6E, the first visualization includes the ray 614 emanating from the portion of the representation 131 of the control device 130 with the circle 615 at the terminal end of the ray 614 with the first set of appearance characteristics.

Furthermore, as shown in FIG. 6E, during the instance 650, the electronic device 120 detects a voice command 652 from the user 149 associated with modifying the visualization associated with the ray projected from the portion (e.g., the tip/end 176) of the control device 130 or the representation 131 thereof. One of ordinary skill in the art will appreciate that the voice command 652 may be replaced with or accompanied by a user input directed to the control device 130 such as a double tap or slide gesture thereon in various other implementations.

Figure 6F:
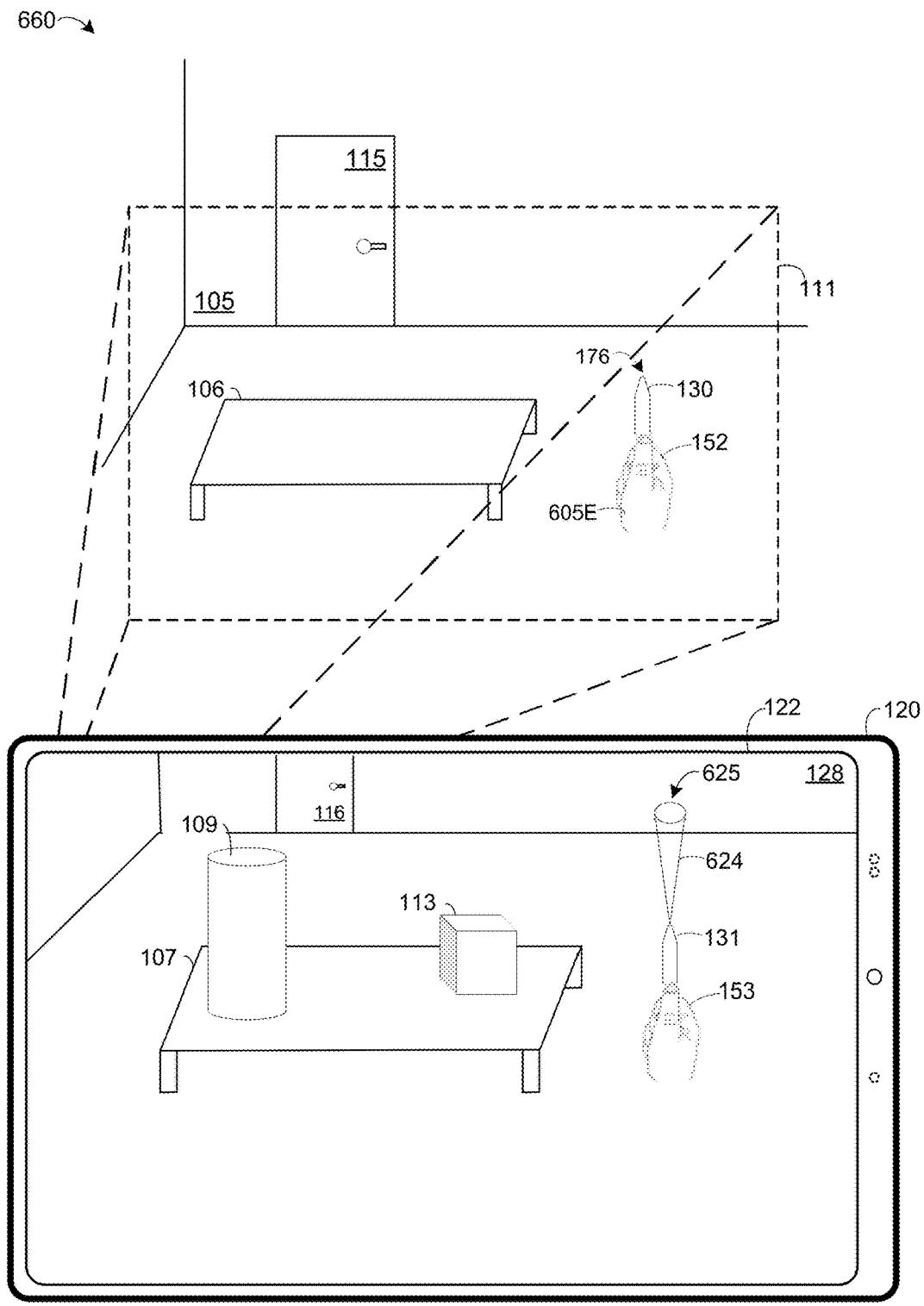

As shown in FIG. 6F, during the instance 660 (e.g., associated with time T$_6$) of the content delivery scenario, in response to detecting the voice command 652 in FIG. 6E, the electronic device 120 changes the visualization associated with the ray projected from the portion (e.g., the tip/end 176)

of the control device 130 or the representation 131 thereof from the first visualization to the second visualization.

As shown in FIG. 6F, the electronic device 120 presents the second visualization associated with the ray projected from the portion (e.g., the tip/end 176) of the control device 130 or the representation 131 with the second set of appearance characteristics. In FIG. 6F, the second visualization includes the cone 624 emanating from the portion of the representation 131 of the control device 130 with the circle 625 at the terminal end of the cone 624 with the second set of appearance characteristics.

Figure 7A:
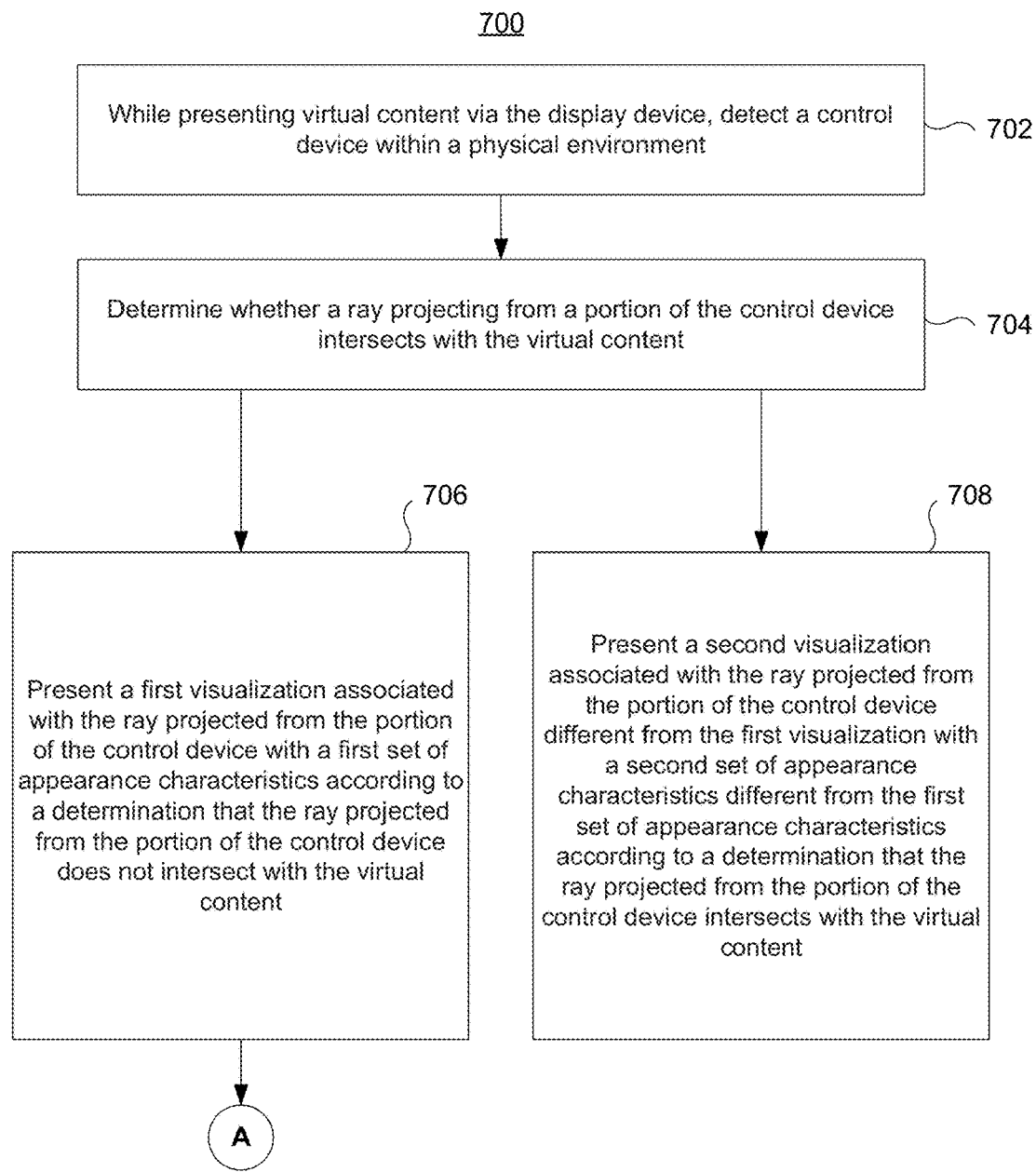

FIGS. 7A and 7B illustrate a flowchart representation of a method of dynamically adjusting a pointer visualization in accordance with some implementations. In various implementations, the method 700 is performed at a computing system including non-transitory memory and one or more processors, wherein the computing system is communicatively coupled to a display device, one or more audio output devices, and one or more input devices via a communication interface (e.g., the electronic device 120 shown in FIGS. 1 and 3; the controller 110 in FIGS. 1 and 2; or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

Typically, laser pointers or other pointing implements correspond to a single color and/or shape. In some cases, the color and/or shape may be manually adjusted. As described herein, a method enables dynamically adjustable pointer visualizations for a control device based on whether the control device is pointed at virtual content in order to facilitate accelerated interactions with virtual content.

As represented by block 702, while presenting virtual content via the display device, the method 700 includes detecting a control device within a physical environment. In some implementations, detecting the control device includes performing six degrees of freedom (6DOF) tracking (e.g., tracking three degrees of rotational freedom and three degrees of translational freedom) on the control device based on at least one of computer vision (CV), hand/extremity tracking data, magnetic tracking data, IMU data, accelerometer data, gyroscope data, and/or the like. In some implementations, the control device corresponds to an electronic device, such as a stylus, the control device or the like, in communication with the computing system. In some implementations, the control device corresponds to a physical object (e.g., the proxy object), such as a ruler, pencil, or the like, which cannot communicate with the computing system.

As represented by block 704, the method 700 includes determining whether a ray projecting from a portion of the control device intersects with the virtual content. For example, in FIG. 6A-6F, the portion of the control device 130 corresponds to an end or tip 176 of the control device 130. According to some implementations, the computing system or a component thereof determines whether a ray projecting from a portion of the control device intersects with the virtual content based on one or more of the object tracking vector 511 (e.g., 6DOF tracking information associated with the control device 130), the pose characterization vector 515 (e.g., including the hand/extremity tracking data for localizing the hand/extremity of the user 149 holding the control device 120), SLAM information associated with the physical environment 105, known locations for the virtual content relative to the physical environment 105, and/or the like. I As represented by block 706, the method 700 includes presenting, via the display device, a first visualization associated with the ray projected from the portion of the control device with a first set of appearance characteristics according to a determination that the ray projected from the portion of the control device does not intersect with the virtual content. As one example, in accordance with a determination that the ray projected from the portion (e.g., the tip/end 176) of the control device 130 or the representation 131 thereof does not intersect with the first virtual object 109 or the second virtual object 113 in FIG. 6A, the electronic device 120 presents a first visualization in FIG. 6A associated with the ray projected from the portion (e.g., the tip/end 176) of the control device 130 or the representation 131 with a first set of appearance characteristics. In FIG. 6A, the first visualization includes a ray 614 emanating from the portion of the representation 131 of the control device 130 with a circle 615 at the terminal end of the ray 614 with the first set of appearance characteristics (e.g., a ray thickness value, a ray opacity/translucency value, a ray color, a ray brightness, a first circle radius, a first line thickness for the perimeter of the circle, a first line color for the perimeter of the circle, a first circle fill color, a first circle fill brightness, and the like). One of ordinary skill in the art will appreciate that the first visualization and/or the first set of appearance characteristics associated therewith in FIG. 6A may be modified in myriad ways in various other implementations.

As represented by block 708, the method 700 includes presenting, via the display device, a second visualization associated with the ray projected from the portion of the control device different from the first visualization with a second set of appearance characteristics different from the first set of appearance characteristics according to a determination that the ray projected from the portion of the control device intersects with the virtual content. As one example, in accordance with a determination that the ray projected from the portion (e.g., the tip/end 176) of the control device 130 or the representation 131 thereof intersects with the first virtual object 109 in FIG. 6B, the electronic device 120 presents a second visualization in FIG. 6B associated with the ray projected from the portion (e.g., the tip/end 176) of the control device 130 or the representation 131 with a second set of appearance characteristics. In FIG. 6B, the second visualization includes a cone 624 emanating from the portion of the representation 131 of the control device 130 with a circle 625 at the terminal end of the cone 624 with the second set of appearance characteristics (e.g., a cone thickness value, a cone opacity/translucency value, a cone color, a cone brightness, a second circle radius, a second line thickness for the perimeter of the circle, a second line color for the perimeter of the circle, a second circle fill color, a second circle fill brightness, and the like). The circle 625 in FIG. 6B is larger than the circle 615 in FIG. 6A. One of ordinary skill in the art will appreciate that the second visualization and/or the second set of appearance characteristics associated therewith in FIG. 6B may be modified in myriad ways in various other implementations.

In some implementations, the computing system or a component thereof presents the second visualization with the second set of appearance characteristics according to a determination that the ray projected from the portion of the control device at least partially intersects or overlaps with the virtual content. with a second set of appearance characteristics different from the first set of appearance characteristics according to a determination that the ray projected from the portion of the control device fully overlaps with the virtual content.

According to some implementations, the second set of appearance characteristics associated with the second visualization is based at least in part on an object type associated with the virtual content, one or more dimensions of the virtual content, or an appearance of the virtual content. According to some implementations, the second visualization corresponds to a collision indicator adjacent to the virtual content. In some implementations, the first and second sets of appearance characteristics include different visualization geometries, different visualization colors, different visualization radii, or the like. In some implementations, the first and second sets of appearance characteristics are based on the virtual content, one or more characteristics of the physical environment 105, user state, user history, user preferences, other contextual information, and/or the like.

In some implementations, the first visualization is associated with a linear geometry and a first radius, and the second visualization is associated with a conical geometry and a second radius greater than the first radius. In some implementations, the first visualization is associated with a first color or texture, and wherein the second visualization is associated with a second color or texture different from the first color or texture and the second visualization is accompanied by at least one of haptic or audible feedback.

According to some implementations, as represented by block 710 in FIG. 7B, the method 700 includes: while presenting the first visualization associated with the ray projected from the portion of the control device with the first set of appearance characteristics, detecting a user input directed to the control device; and in response to detecting the user input directed to the control device, transitioning from the first visualization to the second visualization associated with the ray projected from the portion of the control device with the second set of appearance characteristics. One of ordinary skill in the art will appreciate that a similar transition from the second visualization to the first visualization may occur upon detecting a similar or different user input in various implementations. In some implementations, the computing system presents an animation associated with the transition from the first visualization to the second visualization, or vice versa.

As one example, in response to detecting a downward slide gesture directed to the control device, the computing system increases a size, radius, etc. of the visualization or otherwise modifies an appearance of the visualization. As another example, in response to detecting an upward slide gesture directed to the control device, the computing system decreases a size, radius, etc. of the visualization or otherwise modifies an appearance of the visualization. As such, continuing with this example, the computing system may present the visualization with continuum of sizes, radii, appearances, etc. in response to detecting a user input (e.g., the downward or upward slide gesture) associated with modifying the appearance thereof. For example, the user input directed to the control device may be replaced with a voice command, a different touch input gesture, or the like.

According to some implementations, as represented by block 712 in FIG. 7B, the method 700 includes: while presenting the first visualization associated with the ray projected from the portion of the control device with the first set of appearance characteristics, detecting a voice command to transition to the second visualization; and in response to detecting the voice command, transitioning from the first visualization to the second visualization associated with the ray projected from the portion of the control device with the second set of appearance characteristics. One of ordinary skill in the art will appreciate that a similar transition from the second visualization to the first visualization may occur upon detecting a similar or different voice command in various implementations. In some implementations, the computing system presents an animation associated with the transition from the first visualization to the second visualization, or vice versa. As one example, in response to detecting the voice command 652 in FIG. 6E, the electronic device 120 changes the visualization associated with the ray projected from the portion (e.g., the tip/end 176) of the control device 130 or the representation 131 thereof from the first visualization to the second visualization in FIG. 6F.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a computing system including non-transitory memory and one or more processors, wherein the computing system is communicatively coupled to a display device and one or more input devices via a communication interface:
      while presenting virtual content via the display device, detecting a control device within a physical environment;
      determining whether a ray projecting from a portion of the control device intersects with the virtual content;
      presenting, via the display device, a first visualization associated with the ray projected from the portion of the control device with a first set of appearance characteristics according to a determination that the ray projected from the portion of the control device does not intersect with the virtual content; and
      presenting, via the display device, a second visualization associated with the ray projected from the portion of the control device different from the first visualization with a second set of appearance characteristics different from the first set of appearance characteristics according to a determination that the ray projected from the portion of the control device intersects with the virtual content, wherein the second set of appearance characteristics associated with the second visualization is based at least in part on one or more dimensions of the virtual content.

2. The method of claim 1, wherein the second set of appearance characteristics associated with the second visualization is based at least in part on an object type associated with the virtual content or an appearance of the virtual content.

3. The method of claim 1, wherein the second visualization corresponds to a collision indicator adjacent to the virtual content.

4. The method of claim 1, wherein the first and second sets of appearance characteristics include different visualization geometries, different visualization colors, or different visualization radii.

5. The method of claim 1, wherein the first visualization is associated with a first color or texture, and wherein the second visualization is associated with a second color or texture different from the first color or texture and the second visualization is accompanied by at least one of haptic or audible feedback.

6. The method of claim 1, further comprising:
   while presenting the first visualization associated with the ray projected from the portion of the control device with the first set of appearance characteristics, detecting a user input directed to the control device; and
   in response to detecting the user input directed to the control device, transitioning from the first visualization to the second visualization associated with the ray projected from the portion of the control device with the second set of appearance characteristics.

7. The method of claim 1, further comprising:
   while presenting the first visualization associated with the ray projected from the portion of the control device with the first set of appearance characteristics, detecting a voice command to transition to the second visualization; and
   in response to detecting the voice command, transitioning from the first visualization to the second visualization associated with the ray projected from the portion of the control device with the second set of appearance characteristics.

8. The method of claim 1, wherein detecting the control device includes performing six degrees of freedom (6DOF) tracking on the control device based on at least one of computer vision (CV), hand/extremity tracking data, magnetic tracking data, inertial measurement unit (IMU) data, accelerometer data, or gyroscope data.

9. The method of claim 1, wherein the control device corresponds to an electronic device in communication with the computing system.

10. The method of claim 1, wherein the control device corresponds to a physical object that cannot communicate with the computing system.

11. A device comprising:
    one or more processors;
    a non-transitory memory;
    an interface for communicating with a display device, one or more audio output devices, and one or more input devices; and
    one or more programs stored in the non-transitory memory, which, when executed by the one or more processors, cause the device to:
       while presenting virtual content via the display device, detect a control device within a physical environment;
       determine whether a ray projecting from a portion of the control device intersects with the virtual content;
       present, via the display device, a first visualization associated with the ray projected from the portion of the control device with a first set of appearance characteristics according to a determination that the ray projected from the portion of the control device does not intersect with the virtual content; and
       present, via the display device, a second visualization associated with the ray projected from the portion of the control device different from the first visualization with a second set of appearance characteristics different from the first set of appearance characteristics according to a determination that the ray projected from the portion of the control device intersects with the virtual content, wherein the second set of appearance characteristics associated with the second visualization is based at least in part on one or more dimensions of the virtual content.

12. The device of claim 11, wherein the second set of appearance characteristics associated with the second visualization is based at least in part on an object type associated with the virtual content or an appearance of the virtual content.

13. The device of claim 11, wherein the second visualization corresponds to a collision indicator adjacent to the virtual content.

14. The device of claim 11, wherein the first and second sets of appearance characteristics include different visualization geometries, different visualization colors, or different visualization radii.

15. The device of claim 11, wherein the first visualization is associated with a first color or texture, and wherein the second visualization is associated with a second color or texture different from the first color or texture and the second visualization is accompanied by at least one of haptic or audible feedback.

16. A non-transitory memory storing one or more programs, which,
when executed by one or more processors of a device with an interface for communicating with a display device, one or more audio output devices, and one or more input devices, cause the device to:
while presenting virtual content via the display device, detect a control device within a physical environment;
determine whether a ray projecting from a portion of the control device intersects with the virtual content;
present, via the display device, a first visualization associated with the ray projected from the portion of the control device with a first set of appearance characteristics according to a determination that the ray projected from the portion of the control device does not intersect with the virtual content; and
present, via the display device, a second visualization associated with the ray projected from the portion of the control device different from the first visualization with a second set of appearance characteristics different from the first set of appearance characteristics according to a determination that the ray projected from the portion of the control device intersects with the virtual content, wherein the second set of appearance characteristics associated with the second visualization is based at least in part on one or more dimensions of the virtual content.

17. The non-transitory memory of claim 16, wherein the second set of appearance characteristics associated with the second visualization is based at least in part on an object type associated with the virtual content or an appearance of the virtual content.

18. The non-transitory memory of claim 16, wherein the second visualization corresponds to a collision indicator adjacent to the virtual content.

19. The non-transitory memory of claim 16, wherein the first and second sets of appearance characteristics include different visualization geometries, different visualization colors, or different visualization radii.

20. The non-transitory memory of claim 16, wherein the first visualization is associated with a first color or texture, and wherein the second visualization is associated with a second color or texture different from the first color or texture and the second visualization is accompanied by at least one of haptic or audible feedback.

* * * * *